United States Patent [19]
Nishihara

[11] Patent Number: 5,986,699
[45] Date of Patent: Nov. 16, 1999

[54] IMAGE DEVICE THAT REARRANGES DATA FOR SUB-IMAGE PRESENTATION

[75] Inventor: Masahiro Nishihara, Nagoya, Japan

[73] Assignee: Brother Kogyo Kabushiki Kaisha, Nagoya, Japan

[21] Appl. No.: 08/814,108

[22] Filed: Mar. 10, 1997

[30] Foreign Application Priority Data

Mar. 11, 1996 [JP] Japan ................................ 8-083292

[51] Int. Cl.⁶ ............................................ H04N 5/228
[52] U.S. Cl. ...................... 348/222; 348/231; 345/127; 386/95; 386/94
[58] Field of Search .................................. 345/439, 131, 345/127; 386/111, 112, 95, 69, 70; 348/222, 231

[56] References Cited

U.S. PATENT DOCUMENTS

| | | | |
|---|---|---|---|
| 5,519,829 | 5/1996 | Wilson | 345/501 |
| 5,677,734 | 10/1997 | Oikawa et al. | 348/405 |
| 5,784,526 | 7/1998 | Shimoda et al. | 386/109 |

*Primary Examiner*—Wendy Garber
*Assistant Examiner*—Carramah J. Quiett
*Attorney, Agent, or Firm*—Oliff & Berridge, PLC

[57] ABSTRACT

An image outputting device receives a plurality of sets of pixel data in a sequential order that constitute an original image. At least part of the received sets of pixel data are rearranged in a predetermined non-sequential order. These rearranged sets of pixel data can be stored in a storage device in sequential order as rearranged. At least a part of the rearranged sets of pixel data are retrieved from the storage device in sequential order and can be output to create a mini sub-image that represents a smaller version of the original image. A header storage area may be provided that can store information on the number of sets of pixel data to be retrieved as well as a magnification rate data. Thus, various mini sub-images can be easily read out without previously producing and storing the various mini sub-images.

11 Claims, 26 Drawing Sheets

IMAGE DATA

| 1 (1) | 5 (2) | 2 (3) | 6 (4) |
|---|---|---|---|
| 9 (5) | 10 (6) | 11 (7) | 12 (8) |
| 3 (9) | 7 (10) | 4 (11) | 8 (12) |
| 13 (13) | 14 (14) | 15 (15) | 16 (16) |

FIG.1 (a) PRIOR ART
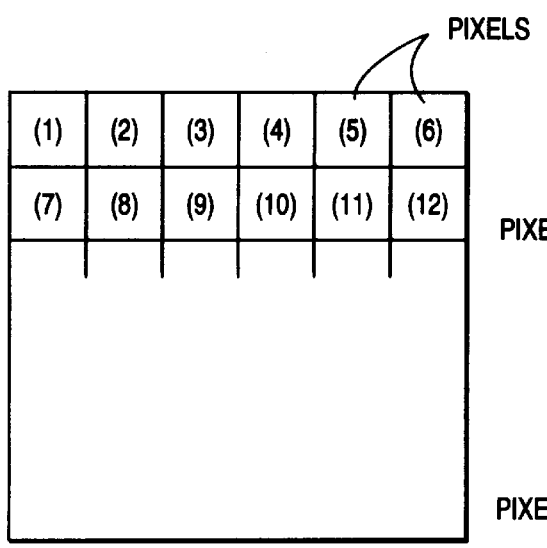
[ IMAGE CONCEPT ON DISPLAY ]
FIG.1 (b) PRIOR ART
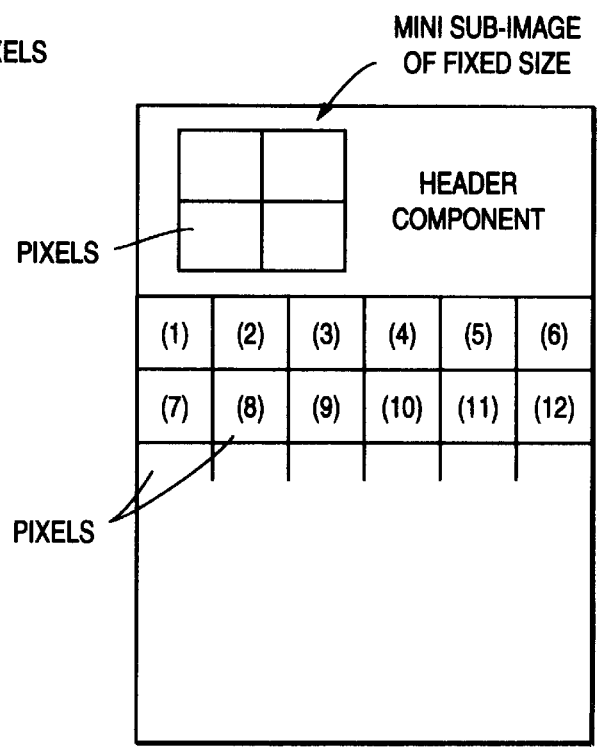
[ STORAGE CONCEPT IN MEMORY ]

IMAGE DATA

| 1<br>(1) | 5<br>(2) | 2<br>(3) | 6<br>(4) |
|---|---|---|---|
| 9<br>(5) | 10<br>(6) | 11<br>(7) | 12<br>(8) |
| 3<br>(9) | 7<br>(10) | 4<br>(11) | 8<br>(12) |
| 13<br>(13) | 14<br>(14) | 15<br>(15) | 16<br>(16) |

MEMORY

| 1<br>(1) | 2<br>(3) | 3<br>(9) | 4<br>(11) | 5<br>(2) | 6<br>(4) | |
|---|---|---|---|---|---|---|

| 1<br>(1) | 2<br>(3) |
|---|---|
| 3<br>(9) | 4<br>(11) |

FIG.4 (a)

[ IMAGE CONCEPT ON DISPLAY ]  PIXELS

| 1 (1) | 17 (2) | 5 (3) | 18 (4) | 2 (5) | 19 (6) | 6 (7) | 20 (8) |
|---|---|---|---|---|---|---|---|
| 33 (9) | 34 (10) | 35 (11) | 36 (12) | 37 (13) | 38 (14) | 39 (15) | 40 (16) |
| 9 (17) | 21 (18) | 10 (19) | 22 (20) | 11 (21) | 23 (22) | 12 (23) | 24 (24) |
| 41 (25) | 42 (26) | 43 (27) | 44 (28) | 45 (29) | 46 (30) | 47 (31) | 48 (32) |
| 3 (33) | 25 (34) | 7 (35) | 26 (36) | 4 (37) | 27 (38) | 8 (39) | 28 (40) |
| 49 (41) | 50 (42) | 51 (43) | 52 (44) | 53 (45) | 54 (46) | 55 (47) | 56 (48) |
| 13 (49) | 29 (50) | 14 (51) | 30 (52) | 15 (53) | 31 (54) | 16 (55) | 32 (56) |
| 57 (57) | 58 (58) | 59 (59) | 60 (60) | 61 (61) | 62 (62) | 63 (63) | 64 (64) |

FIG.4 (b)

[ STORAGE CONCEPT IN MEMORY ]

| HEADER COMPONENT |
|---|
| 1 (1) |
| 2 (5) |
| 3 (33) |
| 4 (37) |
| 5 (3) |
| 6 (7) |
| 7 (35) |

FIG.5 (a)

4 PIXELS

| 1 (1) | 2 (5) |
|---|---|
| 3 (33) | 4 (37) |

FIG.5 (b)

16 PIXELS

| 1 (1) | 5 (3) | 2 (5) | 6 (7) |
|---|---|---|---|
| 9 (17) | 10 (19) | 11 (21) | 12 (23) |
| 3 (33) | 7 (35) | 4 (37) | 8 (39) |
| 13 (49) | 14 (51) | 15 (53) | 16 (55) |

FIG.5 (c)

64 PIXELS (ALL)

| 1 (1) | 17 (2) | 5 (3) | 18 (4) | 2 (5) | 19 (6) | 6 (7) | 20 (8) |
|---|---|---|---|---|---|---|---|
| 33 (9) | 34 (10) | 35 (11) | 36 (12) | 37 (13) | 38 (14) | 39 (15) | 40 (16) |
| 9 (17) | 21 (18) | 10 (19) | 22 (20) | 11 (21) | 23 (22) | 12 (23) | 24 (24) |
| 41 (25) | 42 (26) | 43 (27) | 44 (28) | 45 (29) | 46 (30) | 47 (31) | 48 (32) |
| 3 (33) | 25 (34) | 7 (35) | 26 (36) | 4 (37) | 27 (38) | 8 (39) | 28 (40) |
| 49 (41) | 50 (42) | 51 (43) | 52 (44) | 53 (45) | 54 (46) | 55 (47) | 56 (48) |
| 13 (49) | 29 (50) | 14 (51) | 30 (52) | 15 (53) | 31 (54) | 16 (55) | 32 (56) |
| 57 (57) | 58 (58) | 59 (59) | 60 (60) | 61 (61) | 62 (62) | 63 (63) | 64 (64) |

| 1<br>(1) | 2<br>(13) |
|---|---|
| 3<br>(289) | 4<br>(301) |

| 1<br>(1) | 5<br>(7) | 2<br>(13) | 6<br>(19) |
|---|---|---|---|
| 9<br>(145) | 10<br>(151) | 11<br>(157) | 12<br>(163) |
| 3<br>(289) | 7<br>(295) | 4<br>(301) | 8<br>(307) |
| 13<br>(433) | 14<br>(439) | 15<br>(445) | 16<br>(451) |

FIG.9

| 1000H | 1001H | 1002H | 1003H | 1004H | 1005H |
|-------|-------|-------|-------|-------|-------|
| 100CH | 100DH | 100EH | 100FH | 1010H | 1011H |

12 (width) × 12 (height)

FIG.10

| | |
|---|---|
| 1 | ← 1000H |
| 17 | ← 1001H |
| 18 | ← 1002H |
| 5 | |
| 19 | |
| 20 | |
| 2 | |
| 21 | |
| 22 | |
| 6 | |
| 23 | |
| 24 | |
| 49 | |
| 50 | |
| 51 | |

FIG.11

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 | 253 | 254 | 255 | 256 | 257 | 258 | 259 | 260 | 261 | 262 | 263 | 264 |
| 265 | 266 | 267 | 268 | 269 | 270 | 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 | 307 | 308 | 309 | 310 | 311 | 312 |
| 313 | 314 | 315 | 316 | 317 | 318 | 319 | 320 | 321 | 322 | 323 | 324 | 325 | 326 | 327 | 328 | 329 | 330 | 331 | 332 | 333 | 334 | 335 | 336 |
| 337 | 338 | 339 | 340 | 341 | 342 | 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 | 379 | 380 | 381 | 382 | 383 | 384 |
| 385 | 386 | 387 | 388 | 389 | 390 | 391 | 392 | 393 | 394 | 395 | 396 | 397 | 398 | 399 | 400 | 401 | 402 | 403 | 404 | 405 | 406 | 407 | 408 |
| 409 | 410 | 411 | 412 | 413 | 414 | 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 | 451 | 452 | 453 | 454 | 455 | 456 |
| 457 | 458 | 459 | 460 | 461 | 462 | 463 | 464 | 465 | 466 | 467 | 468 | 469 | 470 | 471 | 472 | 473 | 474 | 475 | 476 | 477 | 478 | 479 | 480 |
| 481 | 482 | 483 | 484 | 485 | 486 | 487 | 488 | 489 | 490 | 491 | 492 | 493 | 494 | 495 | 496 | 497 | 498 | 499 | 500 | 501 | 502 | 503 | 504 |
| 505 | 506 | 507 | 508 | 509 | 510 | 511 | 512 | 513 | 514 | 515 | 516 | 517 | 518 | 519 | 520 | 521 | 522 | 523 | 524 | 525 | 526 | 527 | 528 |
| 529 | 530 | 531 | 532 | 533 | 534 | 535 | 536 | 537 | 538 | 539 | 540 | 541 | 542 | 543 | 544 | 545 | 546 | 547 | 548 | 549 | 550 | 551 | 552 |
| 553 | 554 | 555 | 556 | 557 | 558 | 559 | 560 | 561 | 562 | 563 | 564 | 565 | 566 | 567 | 568 | 569 | 570 | 571 | 572 | 573 | 574 | 575 | 576 |

| | |
|---|---|
| 24 | DATA SIZE (X) |
| 24 | DATA SIZE (Y) |
| 1 | IMAGE DATA |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| . | |
| . | |
| . | |
| . | |
| 549 | |
| 550 | |
| 551 | |
| 552 | |
| 553 | |
| 554 | |
| 555 | 566 |
| 556 | 567 |
| 557 | 568 |
| 558 | 569 |
| 559 | 570 |
| 560 | 571 |
| 561 | 572 |
| 562 | 573 |
| 563 | 574 |
| 564 | 575 |
| 565 | 576 |

FIG.18

| | |
|---|---|
| 584 | TOTAL DATA SIZE |
| 7 | HEADER SIZE |
| 1 | STANDARD SIZE ( X ) |
| 1 | STANDARD SIZE ( Y ) |
| 4 | MAGNIFICATION RATE DATA NUMBER |
| 2 | MAGNIFICATION RATE DATA |
| 2 | MAGNIFICATION RATE DATA |
| 2 | MAGNIFICATION RATE DATA |
| 3 | MAGNIFICATION RATE DATA |
| 1 | IMAGE DATA (FROM HERE ON) ←LEADING END |
| 13 | |
| 289 | |
| 301 | |
| 7 | |
| 19 | |
| 295 | |
| 307 | |
| 145 | |
| 151 | |
| 157 | |
| 163 | |
| 433 | |
| 439 | |
| 445 | |
| 451 | |
| 4 | |
| 10 | |
| 16 | |
| 22 | |
| 148 | |
| 154 | |
| 160 | |
| 166 | |
| 292 | |
| 298 | |
| 304 | |
| 310 | |
| 436 | |
| 442 | |
| 448 | |
| 454 | |
| 73 | |
| 76 | |
| 79 | |
| 82 | |
| 85 | |
| 88 | |
| 91 | |
| 94 | |
| 217 | 574 |
| 220 | 575 |
| | 576 |

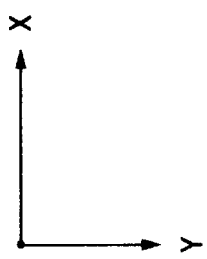
FIG.25 (a)  out_x = 1
              out_y = 1
              1
FIG.25 (b)  out_x = 2
              out_y = 2
              1    13
              289  301
FIG.25 (c)  out_x = 3
              out_y = 3
              1    7    13
              145  151  157
              289  295  301
FIG.25 (d)  out_x = 4
              out_y = 4
              1    7    13   19
              145  151  157  163
              289  295  301  307
              433  439  445  451
FIG.25 (e)  out_x = 8
              out_y = 8
              1    4    7    10   13   16   19   22
              73   76   79   82   85   88   91   94
              145  148  151  154  157  160  163  166
              217  220  223  226  229  232  235  238
              289  292  295  298  301  304  307  310
              361  364  367  370  373  376  379  382
              433  436  439  442  445  448  451  454
              505  508  511  514  517  520  523  526

FIG.25 (f)

out_x = 9
out_y = 9

| 1 | 3 | 5 | 8 | 11 | 14 | 17 | 20 | 23 |
|---|---|---|---|---|---|---|---|---|
| 49 | 51 | 53 | 56 | 59 | 62 | 65 | 68 | 71 |
| 97 | 99 | 101 | 104 | 107 | 110 | 113 | 116 | 119 |
| 169 | 171 | 173 | 176 | 179 | 182 | 185 | 188 | 191 |
| 241 | 243 | 245 | 248 | 251 | 254 | 257 | 260 | 263 |
| 313 | 315 | 317 | 320 | 323 | 326 | 329 | 332 | 335 |
| 385 | 387 | 389 | 392 | 395 | 398 | 401 | 404 | 407 |
| 457 | 459 | 461 | 464 | 467 | 470 | 473 | 476 | 479 |
| 529 | 531 | 533 | 536 | 539 | 542 | 545 | 548 | 551 |

# IMAGE DEVICE THAT REARRANGES DATA FOR SUB-IMAGE PRESENTATION

BACKGROUND OF THE INVENTION

1. Field of the Invention

The present invention relates to an image storing-and-outputting device for storing image data and then outputting the image data.

2. Description of the Related Art

There is conventionally known an image storing-and-outputting device for storing image data and then outputting the image data. The image data is bit map data constructed from a plurality of sets of pixel data arranged two-dimensionally.

FIG. 1(a) illustrates how the image data of a plurality of pixels are displayed on a display screen. FIG. 1(b) shows how the image data is stored in a memory area of the image storing-and-outputting device. As apparent from the drawing, the plurality of sets of pixel data are stored in the memory area in a sequential fashion in correspondence with the order in which the pixels will be displayed on the screen.

Conventionally, there is proposed an image storing-and-outputting device of a type that can output a mini sub-image which represents the original image but which has a reduced size. When instructed by a user to produce a mini sub-image of the user's desired size, the device creates the mini sub-image. Alternatively, the device previously stores data of a mini sub-image of a certain size together with the data of the original image. In this case, the device stores the data of the mini sub-image in a header portion of the memory as shown in FIG. 1(b). The mini sub-image data is produced through thinning the original image data.

SUMMARY OF THE INVENTION

In order to store the mini sub-image data together with the original image data, the image storing-and-outputting device has to be formed with a large amount of memory area at the head portion.

When a display device, connected to the image storing-and-outputting device, is changed with a new one, however, the resolution of the display device will possibly change. In this case, a reduction rate, with which the original image has to be reduced into the mini sub-image, will also change. Accordingly, every time the reduction rate thus changes, the image storing-and-outputting device has to create the mini sub-image of the fixed size. The device has to retrieve the entire image data from the memory area and thin the entire image data into the mini sub-image data. It takes a long period of time to process the entire image data to produce the mini sub-image data. It therefore takes a long period of time before the mini sub-image is finally obtained and displayed.

In order to create and then display the mini sub-image within a short period of time, the image storing-and-outputting device has to be equipped with a sufficiently large memory area and with a high speed processor.

An object of the present invention is therefore to solve the above-described problems, and to provide an improved image storing-and-outputting device which does not need any memory areas especially used for storing the mini sub-image, which can easily produce the mini sub-image within a short period of time without performing the thinning process onto the original image data, and which can produce and output various images of lowered resolutions.

In order to attain the above and other objects, the present invention provides an image outputting device for outputting image data, the device comprising: reception means for receiving a plurality of sets of pixel data in a sequential order, the plurality of sets of pixel data constituting a data matrix indicative of an entire original image; rearranging means for rearranging at least partly the received plurality of sets of pixel data in a predetermined non-sequential order; and retrieving means for retrieving at least a part of the rearranged sets of pixel data in a sequential order as rearranged by the rearranging means.

The image outputting device may further comprise output means for further rearranging the retrieved sets of pixel data in another predetermined non-sequential order to reproduce the original image.

The image outputting device may further comprise storage means for storing the rearranged sets of pixel data in the sequential order as rearranged by the rearranging means, the retrieving means retrieving the rearranged sets of pixel data in the order stored in the storage means.

BRIEF DESCRIPTION OF THE DRAWINGS

The above and other objects, features and advantages of the invention will become more apparent from reading the following description of the preferred embodiment taken in connection with the accompanying drawings in which:

FIG. 1(a) illustrates how a plurality of sets of pixel data are received and displayed;

FIG. 1(b) illustrates how the plurality of sets of pixel data of FIG. 1(a) are stored in a conventional image storing-and-outputting device;

FIG. 2(a) illustrates how a plurality of sets of pixel data (1)–(16) are renumbered and are displayed;

FIG. 2(b) illustrates how the renumbered plurality of sets of pixel data of FIG. 2(a) are stored in an image storing-and-outputting device of the present invention;

FIG. 2(c) illustrates how a mini sub-image is produced from four sets of pixel data;

FIG. 4(a) illustrates how a plurality of sets of pixel data (1)–(64) are renumbered and then displayed;

FIG. 4(b) illustrates how the renumbered plurality of sets of pixel data of FIG. 4(a) are stored in the image storing-and-outputting device of the present embodiment;

FIG. 5(a) illustrates how a mini sub-image (standard image) is produced from four sets of pixel data retrieved from the memory shown in FIG. 4(b);

FIG. 5(b) illustrates how another mini sub-image is produced from 16 sets of pixel data retrieved from the memory shown in FIG. 4(b);

FIG. 5(c) illustrates how the original image is produced from 64 sets of pixel data retrieved from the memory shown in FIG. 4(b);

FIG. 9 illustrates how to store the pixel data of the 12×12 mini sub-image into 12×12 storage addresses;

FIG. 10 illustrates a table showing how to displaying pixel data stored in the respective storage addresses of FIG. 9 onto pixel positions to display the 12×12 mini sub-image;

FIG. 11 illustrates how original pixel data is arranged in an original with a size of (24×24) when the original pixel data is received by the image storing-and-outputting device of the present embodiment;

FIG. 18 illustrates an example of data format obtained through the encoding process of FIGS. 13–17;

FIG. 25(a) illustrates an example of a mini sub-image with a size of 1×1 obtained through the decoding process;

FIG. 25(b) illustrates an example of another mini sub-image with a size of 2×2;

FIG. 25(c) illustrates an example of another mini sub-image with a size of 3×3 which is produced through thinning a mini sub-image with a size of 4×4;

FIG. 25(d) illustrates an example of the mini sub-image with the size of 4×4 obtained through the decoding process;

FIG. 25(e) illustrates an example of a mini sub-image with a size of 8×8 obtained through the decoding process;

FIG. 25(f) illustrates an example of another mini sub-image with a size of 9×9 which is produced through thinning a mini sub-image with a size of 24×24;

DETAILED DESCRIPTION OF THE INVENTION

Figures 2, 3:
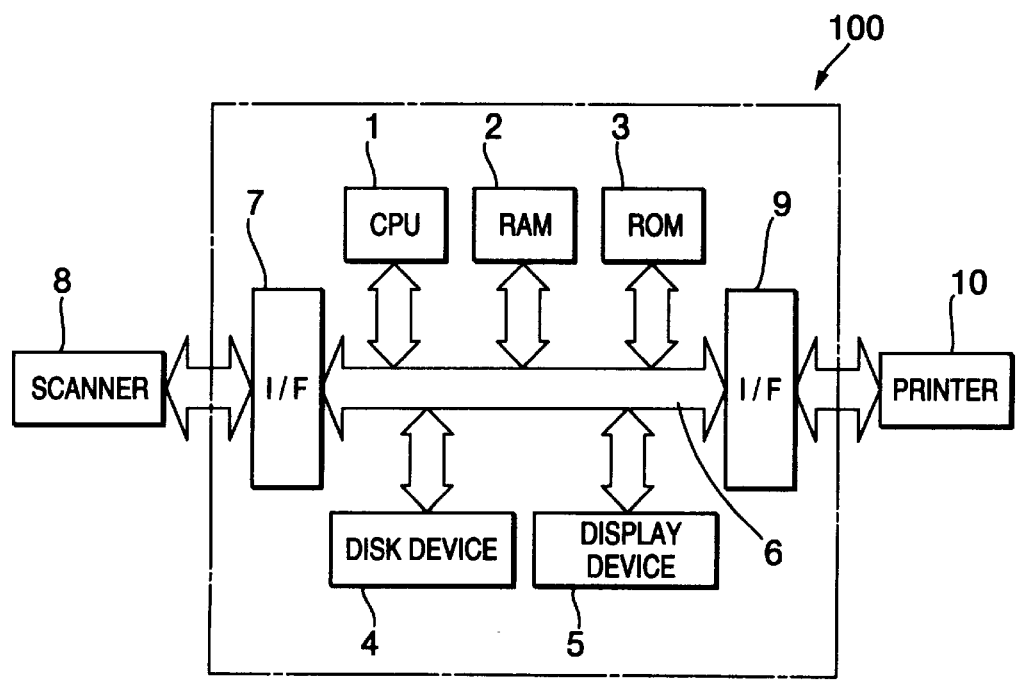
FIG. 3 is a block diagram of an image storing-and-outputting device according to an embodiment of the present invention.

An image storing-and-outputting device according to the present invention will be described while referring to the accompanying drawings wherein like parts and components are designated by the same reference numerals to avoid duplicating description.

First, the image storing-and-outputting device of the present invention will be briefly described with reference to FIGS. 2(a) through 2(c).

It is now assumed that the image storing-and-outputting device receives a data matrix shown in FIG. 2(a), for example. The data matrix includes a plurality of sets of (16 in this example) pixel data (bit map data). The 16 sets of pixel data constitute an entire original image. In the same manner as in the conventional image storing-and-outputting device, the image storing-and-outputting device of the present invention receives the pixel data in a sequential order represented by the number in parentheses. That is, the device receives the series of sets of pixel data (1), (2), . . . , and (16) in this order. When arranged as shown in FIG. 2(a), the 16 sets of pixel data (1)–(16) reproduce the original image.

In the image storing-and-outputting device of the present invention, the received plurality of sets of pixel data are then renumbered in a predetermined non-sequential order as also shown in FIG. 2(a). For example, the pixel data (2) is renumbered as 5, and the pixel data (3) is renumbered as 2. As shown in FIG. 2(b), the thus renumbered 16 sets of pixel data are stored in a memory area, such as a buffer memory, in a sequential order of the newly-assigned number. That is, the 16 sets of pixel data, which are now numbered 1, 2, 3, . . . , and 16, are stored in the number order 1, 2, 3, . . . , and 16. Accordingly, the pixel data originally numbered as (1), (3), (9), . . . , (15), and (16) are stored in this order.

It is noted that in this example, all the 16 sets of pixel data for the original image are stored in the memory area. However, the pixel data of only a part of the original image may be stored in the memory area. For example, the device may store only the sets of pixel data 1, 2, 3, and 4 in this order. That is, the device may store only the pixel data (1), (3), (9), and (11) in this order.

When outputting the original image for display, the 16 sets of pixel data 1–16 are successively retrieved from the leading end of the memory area in FIG. 2(b), and then arranged in the non-sequential order into the original data matrix as shown in FIG. 2(a). When producing a mini sub-image as shown in FIG. 2(c), only pixel data of the corresponding number will be successively retrieved from the leading end of the memory area. For example, when desiring to obtain a mini sub-image with a size of 2×2, four sets of pixel data 1 through 4 are successively retrieved from the memory area, and are arranged as shown in FIG. 2(c). Accordingly, the mini sub-image is produced by the four pixels (1), (3), (9), and (11). Then, the 2×2 mini sub-image is outputted to a display device. Thus, a mini sub-image of a desired resolution and of a desired display size can be obtained simply through successively retrieving a corresponding number of sets of pixel data from the leading end of the memory area and then rearranging the retrieved pixel data in the non-sequential order.

Next will be described an image storing-and-outputting device according to an embodiment of the present invention.

FIG. 3 schematically shows the image storing-and-outputting device 100 of this embodiment. In the device 100, a CPU 1, a RAM 2, a ROM 3, a disk device 4, a display device 5, and interfaces 7 and 9 are connected to each other via a bus line 6. The device 100 is connected to a scanner 8 via the interface 7, and is connected to a printer 10 via the interface 9.

The CPU 1 is for controlling the entire device 100. The ROM 3 stores therein control programs which the CPU 1 executes for controlling the entire device 100. For example, the ROM 3 stores a control program of a mini sub-image displaying process shown in FIG. 8. The ROM 3 also stores font data and so on.

The RAM 2 is formed with memory areas, such as a work area, in which data is temporarily stored during data processing operations. For example, the RAM 2 is formed with storage areas shown in FIG. 9 and a table shown in FIG. 10, in which data is temporarily stored during the mini sub-image displaying process as will be described later.

The interface 7 is for receiving a plurality of sets of pixel data from the image scanner 8, for example. All the sets of pixel data constitute an original image. In this example, the original image is constructed from 64 sets of pixel data (1)–(64) as shown in FIG. 4(a). It is noted that each square in FIG. 4(a) corresponds to a pixel, and a number in a parenthesis appearing in each square corresponds to a pixel number. The interface 7 successively receives the pixel data set series according to an order of the number in the parenthesis. That is, the interface 7 successively receives the pixel data sets (1)–(64) in this order. The pixel data sets (1)–(64) are for constituting the original image as shown in FIG. 4(a). That is, the original image is reproduced when the pixel data sets (1)–(64) are displayed on the display device 5 as shown in FIG. 4(a).

The disk device 4 is for storing all the pixel data sets inputted from the scanner 8 in a format shown in FIG. 4(b). According to the embodiment, before being stored, the 64 sets of pixel data (1)–(64) are renumbered as shown in FIG. 4(a), and then stored in the disk device 4 in the renumbered order. As a result, as apparent from FIG. 4(b), the sets of pixel data (1), (5), (33), . . . , and (64) are stored in this order from the leading end toward the trailing end. Thus, the disk device 4 stores all the sets of pixel data in the sequence of the newly-assigned pixel numbers. The disk device 4 is formatted such that pixel data sets will be read out in the number sequence of the newly-assigned pixel numbers.

The display device 5 is for displaying the entire original image as shown in FIG. 5(c) based on all the sets of pixel data (1)–(64) stored in the disk device 4. The display device 5 can display a mini sub-image when a corresponding amount of pixel data is sent from the disk device 4 to the display device 5. For example, the display device 5 displays a mini sub-image of FIG. 5(a) when four sets of pixel data (1), (5), (33), and (37), which are stored first through fourth in the memory area, are retrieved from the disk device 4. The display device 5 displays another mini sub-image of FIG. 5(b) when 16 sets of pixel data (1), . . . , and (55), which are stored first through 16-th in the memory area, are retrieved from the disk device 4. Thus, the size of the displayed mini sub-image increases as the number of retrieved pixels increases. In this case, when all of the 64 pixels (1)–(64) are read out, the original image shown in FIG. 5(c) will be displayed. It is noted that in the present description, the number of pixels constituting each image is very small for simplicity and clarity. However, in actual practice, each of the mini sub-images and the full-size (original) image is made up of many more pixels.

Next will be given a more detailed description of how to store the received pixel data and of how to produce mini sub-images of various sizes according to the present embodiment.

The following description is given for an example where the device 100 receives 576 sets of pixel data (1) through (576) which are arranged as shown in FIG. 6(d) to reproduce an original image. That is, the original image has a size of 24×24. In more concrete terms, the original image has 576 pixels (1)–(576) which are arranged in 24 rows or lines and in 24 columns. Each of the 24 rows extends in a X direction, and each of the 24 columns extends in a Y direction perpendicular to the X direction.

In FIG. 6(d), in the same manner as described above with reference to FIGS. 2(a) through 5(c), the numeral in a parenthesis appearing in each pixel indicates the order in which the pixel is transmitted from the image scanner 8 and therefore is to be arranged for displaying the original image. In other words, the pixel data sets (1)–(576) are transmitted from the image scanner 8 in this order. The pixel data sets (1)–(576) arranged as shown in FIG. 6(d) reproduces the original image. The other numeral also appearing in each pixel indicates the order in which the pixel is stored in the disk device 4 and then is to be retrieved from the disk device 4. For example, the pixel data (1) is stored first, the pixel data (2) is stored 145th, and the pixel data (3) is stored 17-th in the disk device 4. The pixel data (1) will be retrieved first, the pixel data (2) will be retrieved 145-th, and the pixel data (3) will be retrieved 17-th from the disk device 4.

Figure 7:
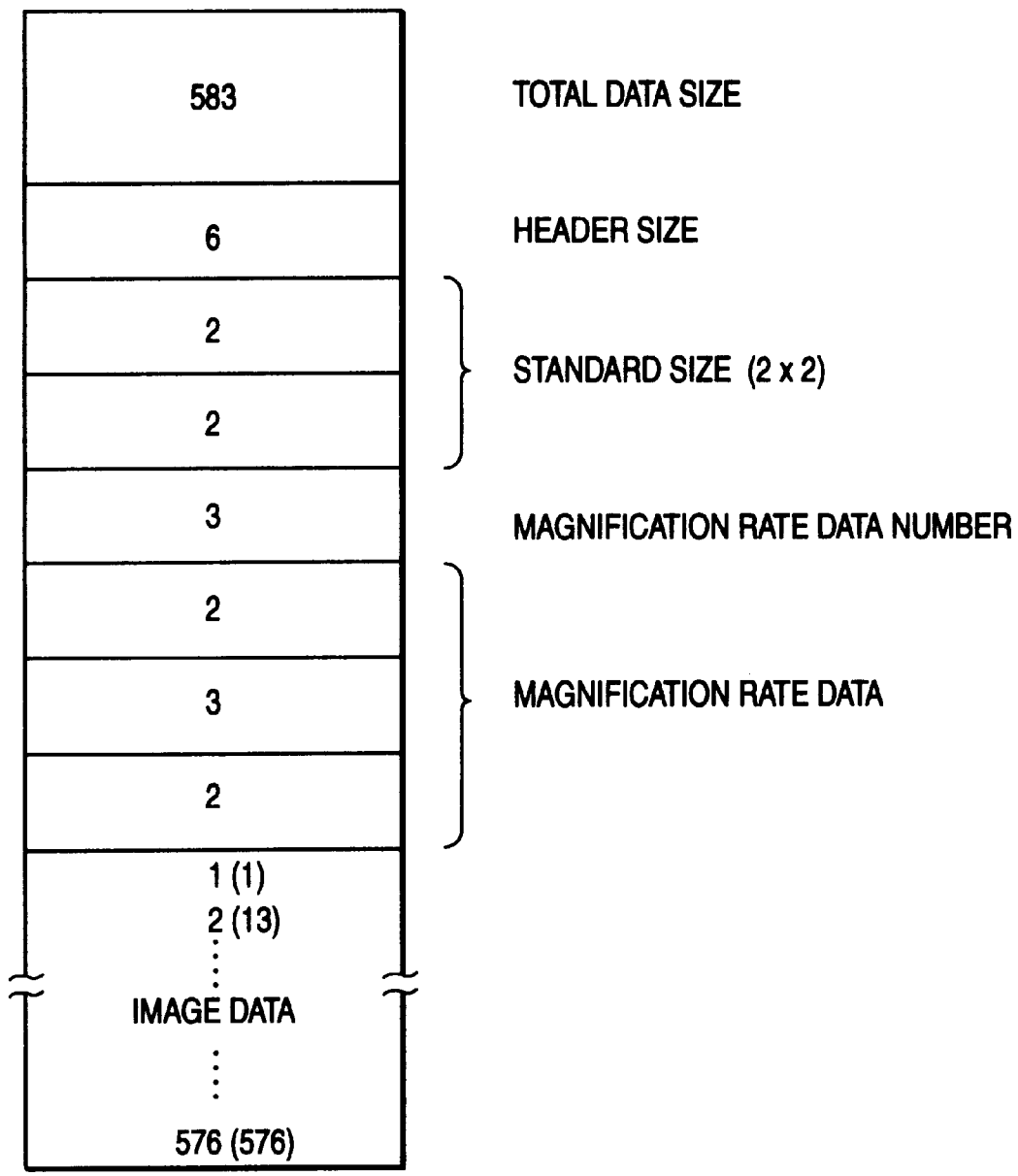
FIG. 7 illustrates an example of a header component stored together with the renumbered plurality of sets of pixel data of FIG. 6(c)

FIG. 7 shows an example of a data format according to which the pixel data sets (1)–(576) are stored in the disk device 4. In FIG. 7, each cell indicates one byte. This format stores a header component preceding all the sets of pixel data (1)–(576).

The contents of the header component will now be described. "Standard size" indicates the size of a standard image determined for the original image. In this example, the standard image is determined as shown in FIG. 6(a) to have a size of 2×2. It is noted that a minimum image with a size of 1×1 may be determined for the standard image. In this case, the minimum size of 1×1 is stored as the "standard size". The "magnification rate data" includes several magnification rates in a certain order. In this example, magnification rates of 2, 3, and 2 are stored. The magnification rates will be used to produce other mini sub-images of various sizes and the original image based on the standard size image. In this example, the magnification rate of 2 is determined for obtaining another mini sub-image shown in FIG. 6(b) with a size of 4×4. This is because the 4×4 image can be obtained through enlarging or magnifying the 2×2 image with the magnification rate of 2 in each of the X and Y directions. The magnification rate of 3 is determined for obtaining still another mini sub-image shown in FIG. 6(c) with a size of 12×12. This is because the 12×12 image can be obtained through enlarging the 4×4 image with the magnification rate of 3 in each of the X and Y directions. The magnification rate of 2 is further determined for obtaining the original image shown in FIG. 6(d) with the size of 24×24. This is because the 24×24 image can be obtained through enlarging the 12×12 image with the magnification rate of 2 in each of the X and Y directions. "Magnification rate data number" indicates the total number of "magnification rate data". In this case, the "Magnification rate data number" is 3. "Header size" indicates the size of the header component, i.e., the sum of: the size of the "Standard Size" area (2 bytes), the size of the "Magnification Rate Date Number" area (1 byte), and the size of the "Magnification Rate Data" area (3 bytes in this example). Accordingly, in this case, the "Header size" is 6 bytes. "Total data size" indicates the size of the entire data format, i.e., a sum of: the sizes of all the pixel data sets (576, in this example), the size of the "Header Size" area (1 byte), and the header size (6 byte in this example). Accordingly, in this example, the total data size is 583 bytes.

Based on data stored in the disk device 4 with the above-described format, the mini sub-images of FIGS. 6(*a*) –6(*c*) and the original image of FIG. 6(*d*) are produced as described below.

Figure 6:
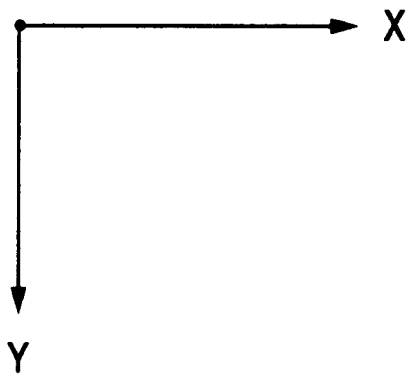
FIG. 6(a) illustrates an example of a standard image.
FIG. 6(b) illustrates an example of a mini sub-image which is obtained through enlarging the standard image of FIG. 6(a) in each of the X and Y directions with a magnification rate of two.
FIG. 6(c) illustrates an example of another mini sub-image which is obtained through enlarging the image of FIG. 6(b) in each of the X and Y directions with a magnification rate of three.
FIG. 6(d) illustrates an example of another mini sub-image which is obtained through enlarging the image of FIG. 6(c) in each of the X and Y directions with a magnification rate of two.
Figure 6:
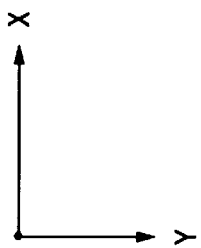
Figure 6:
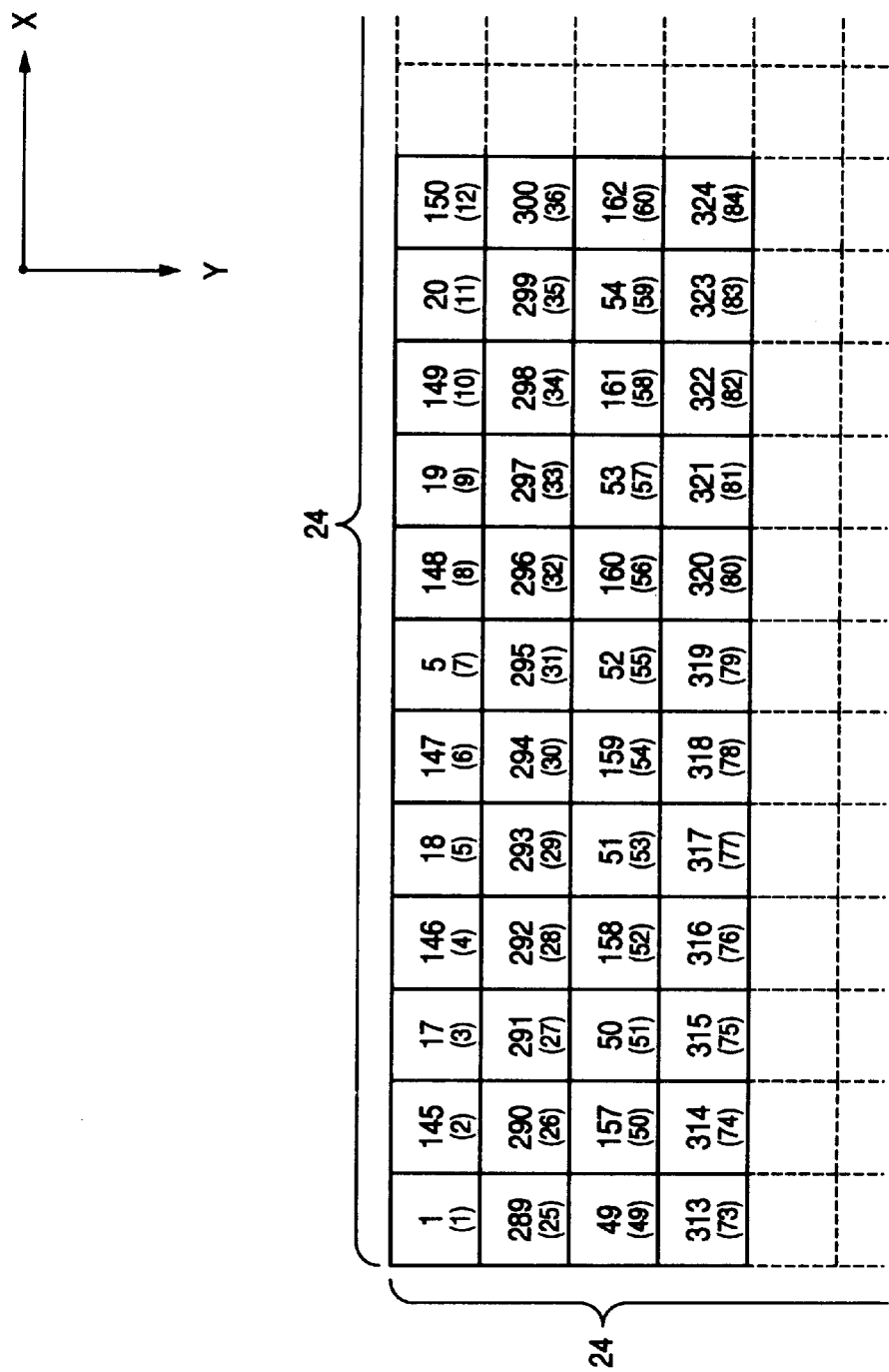

The 2×2 (standard size) mini sub-image of FIG. 6(*a*) is obtained when four pixels 1–4 are read out and arranged as shown in the figure. The 4×4 mini sub-image of FIG. 6(*b*) is obtained when 16 pixels 1–16 are retrieved and arranged as shown in the figure. Similarly, the 12×12 mini sub-image of FIG. 6 (*c*) is obtained when 144 pixels 1–144 are retrieved and arranged as shown in the figure. The 24×24 original image of FIG. 6(*d*) is obtained when all the 576 pixels 1–576 are retrieved and arranged as shown in the figure.

In order to produce the standard image of FIG. 6(*a*), pixels "1" through "4," which are stored in the first through fourth positions in the pixel data storage area of the disk device 4, are retrieved and arranged as shown in the drawing.

When one mini sub-image (which will be referred to a mini sub-image I) is produced, a larger-sized image (which will be referred to a mini sub-image I') can be produced through enlarging the already-produced mini sub-image I with a corresponding magnification rate. In order to magnify the already-produced mini sub-image I, pixels are successively retrieved from the disk device 4 at locations next to the locations, from which pixels have been already retrieved to produce the mini sub-image I. The retrieved pixels are arranged first in the X direction (the horizontal scanning direction) and then in the Y direction (the vertical scanning direction). In more concrete terms, in order to enlarge the image size in the X direction, thus newly-retrieved pixels are located between each two adjacent pixels, which are already retrieved and arranged in the mini sub-image I. The number of the pixels, newly added between each two adjacent pixels, is equal to a number obtained by subtracting a value of "1" from the magnification rate value. For example, one pixel is retrieved and added between each two adjacent already-retrieved pixels of the image I when enlarging the image I with the magnification rate of "2". Successively-retrieved two pixels are added between each two adjacent already-retrieved pixels of the image I when enlarging the already-produced image I with the magnification rate of "3". In order to enlarge the image in the Y direction, on the other hand, lines (a group of pixels running in the X direction) are newly added between each two adjacent pixel lines which have been enlarged as described above in the X direction. The number of the lines, newly added between two adjacent lines, is equal to a value obtained through subtracting the value of "1" from the magnification rate value. Then, extra pixels are arranged to the right and lower ends of the image.

For example, in order to enlarge the standard image of FIG. 6(*a*) in each of the X and Y directions with the magnification rate of 2 to produce the mini sub-image of FIG. 6(*b*), a pixel 5 is retrieved from the fifth location in the pixel data storage area of the disk device 4, and is positioned between the pixels 1 and 2 of the standard image. Then, a pixel 6 is retrieved from the sixth location in the pixel data storage area of the disk device 4, and is positioned at the right end. Similarly, pixels 7 and 8 are retrieved and positioned on the second line. Thus, the image is doubled in size in the X direction. The image is then doubled in size in the Y direction. That is, a line (pixels 9, 10, 11, and 12) is produced between the first line (pixels 1, 5, 2, and 6) and the second line (pixels 3, 7, 4, and 8). Another line (pixels 13, 14, 15, and 16) is positioned at the lower end. As a result, the image of FIG. 6(*b*) is obtained. This image has a size twice as large as that in FIG. 6(*a*) in each of the X and Y directions.

Processing operations basically the same as the above-described operations are applied to enlarge the already-produced image of FIG. 6(*b*) into the image of FIG. 6(*c*). Similarly, processing operations basically the same as the above-described operations are applied to enlarge the already-produced image of FIG. 6(*c*) into the image of FIG. 6(*d*).

Figure 8:
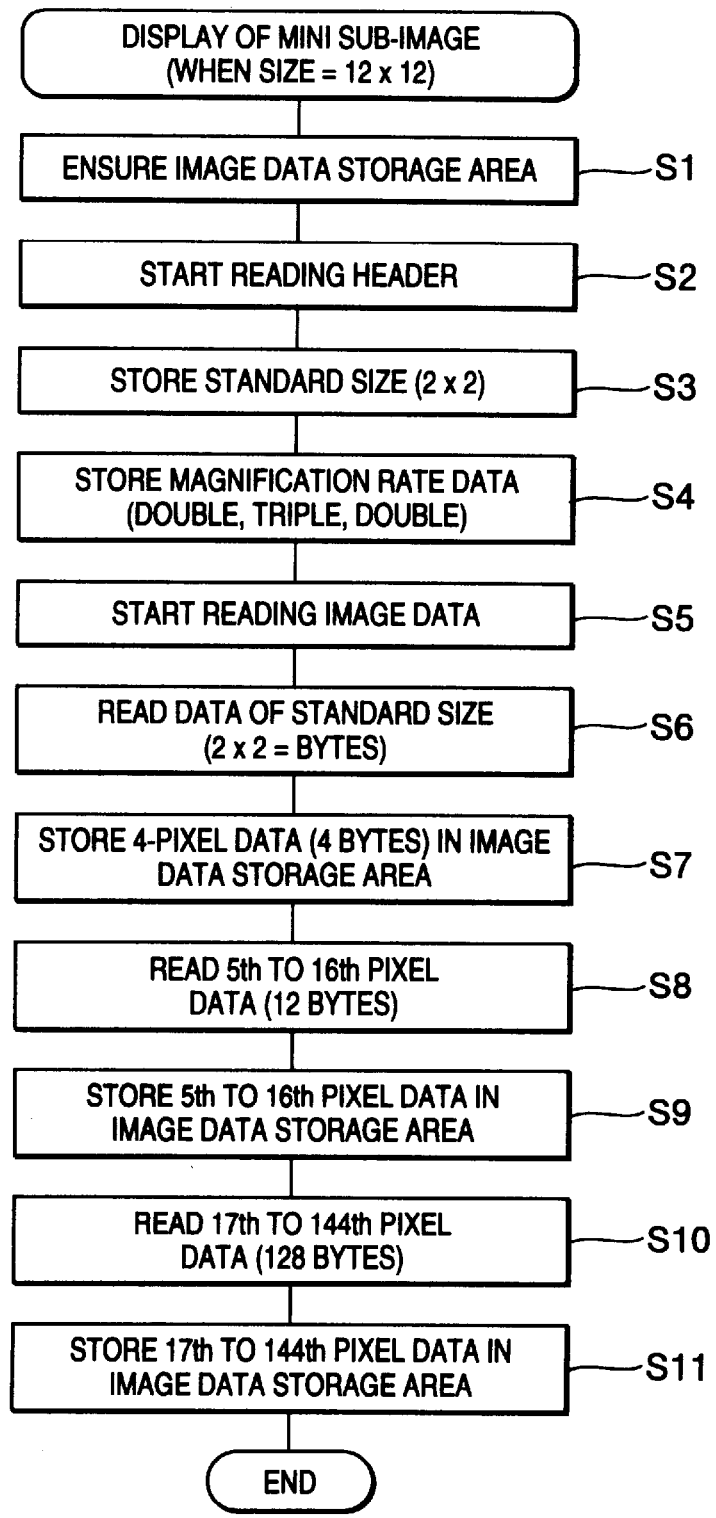
FIG. 8 is a flow chart of producing the mini sub-image of FIG. 6(c) with a size of 12×12 based on data format shown in FIG. 7.

FIG. 8 is a flow chart of a process for producing the 12×12 mini sub-image of FIG. 6(*c*) based on the data format as shown in FIG. 7. First, in S1, an area for storing image data of 12×12=144 bytes is ensured in the RAM 2. FIG. 9 shows the image data storage area in the RAM 2. The address of the image data storage area begins with 1000H where H indicates that 1000 is hexadecimal. Data in each address will be displayed on a pixel with its pixel number being stored in a corresponding location shown in a table of FIG. 10. The table of FIG. 10 is also produced in S1 for producing the 12×12 mini sub-image. For instance, data, numbered "20," is written into the address 1005H, and will be displayed at the sixth position from the left on the first line of the 12×12 image as shown in FIG. 6(*c*).

Next, the header component of the image data is retrieved from the disk device 5 in S2. The header component indicates that image data, stored together with this header component, is formatted such that the standard size is 2×2, and that the original image will be produced with the magnification rates of 2, 3, and 2. The standard size data and the magnification rate data are temporarily written in the RAM 2 in S3 and S4. These data indicate that as image data is read successively from the leading end, images with sizes of 2×2, 4×4, 12×12, and 24×24 will be obtained successively. Since the size of the image desired to be produced is now 12×12, the image can be formed without any thinning operations (reduction procedure). It can be seen that this mini sub-image can be formed when 12×12=144 bytes of pixel data has been read out from the leading end of the image data storage area in the disk device 4.

Next, the CPU 1 starts reading pixel data from the data format of FIG. 7 in S5. First, in S6, the CPU 1 reads data enough to produce the standard size. Because the standard size is composed of four pixels in this example, 4 bytes are read from the leading end. The retrieved four pixel data are written in the image data storage area of FIG. 9 in S7. As to the storage position of the pixel data, since the desired image size is 12×12, five more pixels must be inserted between these standard pixels. Therefore, the retrieved four pixel data "1", "2", "3", and "4" are stored such that there will be five pixels' worth of spaces between the pixels. For example, the CPU 1 stores the first and second data in the addresses of 1000H and 1006H, respectively, while referring to the table of FIG. 10.

Next, this image is enlarged in S8 and S9 in each of the X and Y directions with the magnification rate of "2" which appears first in the header magnification rate data area of FIG. 7. This is accomplished by inserting one pixel between the standard pixels as shown in FIG. 6(*b*). In order to attain this procedure, four pixel data (the fifth to eighth) are read out in order to enlarge the standard image in the X direction, and eight pixel data (the ninth to 16th) are read out in order to enlarge the image in the Y direction. For example, the CPU 1 stores the fifth pixel data in the address 1003H while referring to the table of FIG. 10. Next, the pixel data from the 17th to the 144th pixel data are read out and stored in the image data storage area of FIG. 9 as shown in FIG. 6(*c*) in S10 and S11. Then, the mini sub-image of 12×12 pixels is produced and is transmitted to the display 5 where the image is displayed as shown in FIG. 6(*c*).

The method of converting the original image into the image format of the present invention will now be described in greater detail. This method involves serially reading the original image with the image scanner 8 or the like, rearranging or encoding the obtained original image data in the predetermined non-sequential order, and then storing the rearranged product.

Figure 12:
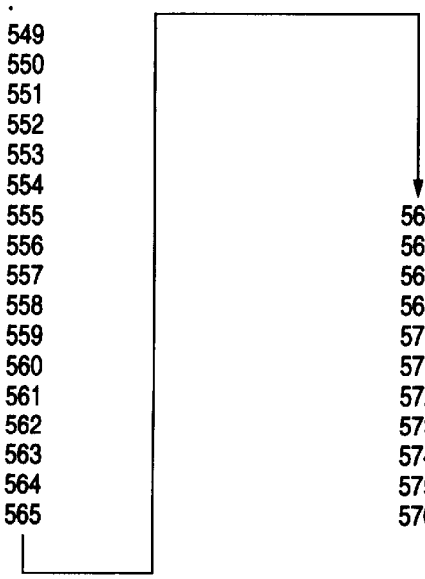
FIG. 12 illustrates data format of the original image data.
Figure 13:
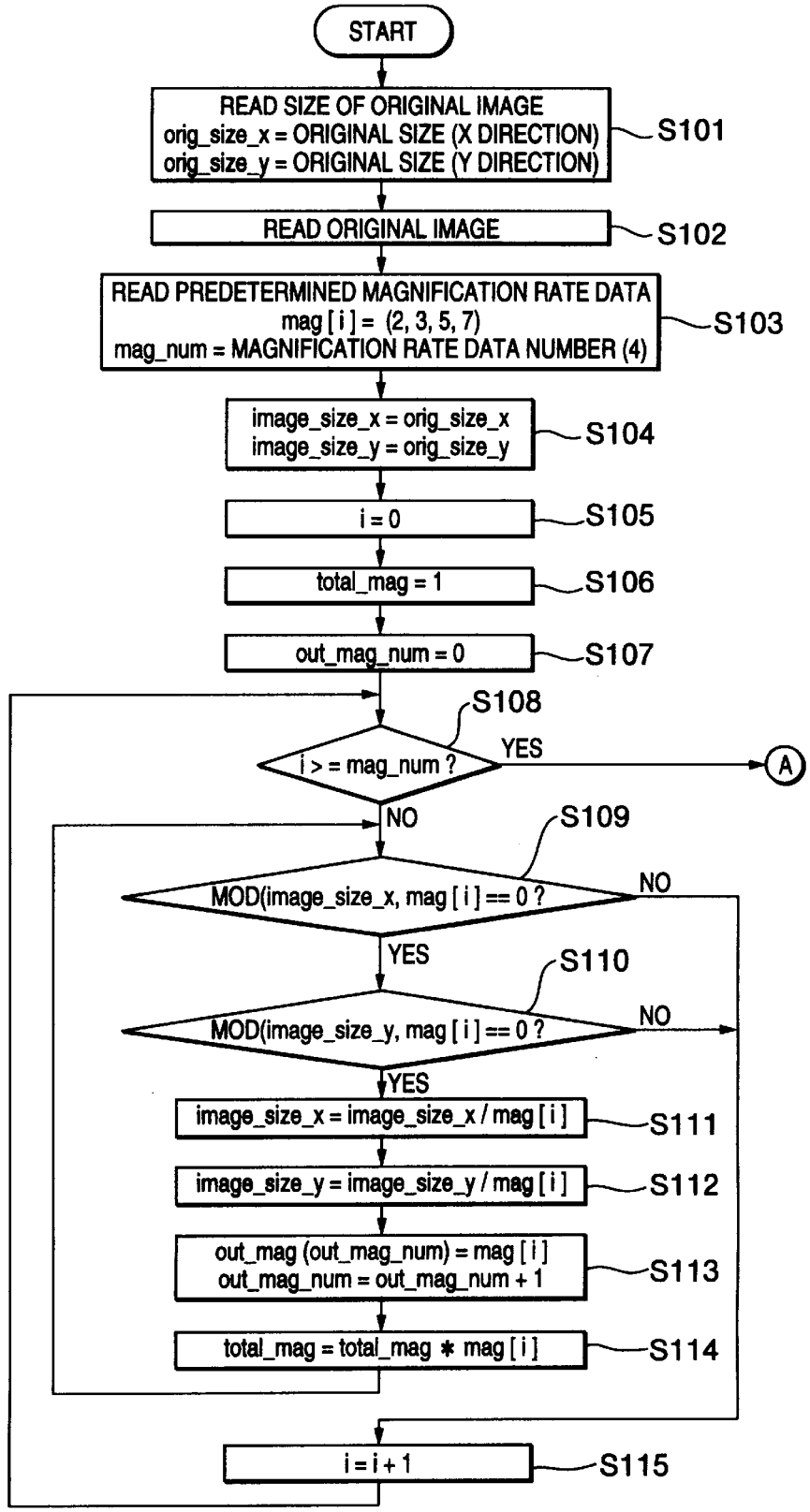
FIG. 13 is a part of a flow chart of an encoding process for rearranging the original pixel data into the storage format of the present embodiment and for storing the rearranged pixel data.

FIG. 11 shows data of an example of an original image with a size of 24×24. The numbers in the data indicate the sequence how pixel data is created by the image scanner 8. That is, the data is created from the upper left to the lower right. FIG. 12 shows the data format of the image of FIG. 11. The data size (24×24) is given at the leading end, and thereafter the image data is given in the order shown in FIG. 12. FIGS. 13 through 17 are flow charts of the process for encoding the received original image data into the data format of the present embodiment. In this example, the image data of FIG. 12 is encoded into data format as shown in FIG. 18. Thus, the pixel data 1–576 are rearranged into the non-sequential order as shown in FIG. 18. It is noted that in the above description, the inputted pixels are rearranged after being renumbered as shown in FIGS. 2(*a*)–10. In the following description, however, the pixels 1–576 are rearranged without being renumbered. That is, the pixels 1, 2, 3, 4, . . . , and 575, and 576 arranged in this order as shown in FIG. 12 will be merely rearranged as shown in FIG. 18. That is, in the data format of FIG. 18, the pixels 1, 13, 289, 301, . . . , 575, and 576 are arranged as the first, the second, the third, . . . , the 575-th, and the 576-th pixels.

In the encoding process, first in S101, the size data of the inputted original image in each of the X and Y directions (X=24, Y=24 in this example) is read out from the data format of FIG. 12. Then, in S102, the original image data is read out from the image scanner 8 while referring to the read out size data.

In S103, predetermined magnification rate data is read out from the ROM 3. The ROM 3 previously stores therein data of several magnification rates mag[i]. In this example, the ROM 3 previously stores data of four magnification rates of 2, 3, 5, and 7. That is, mag[0]=2, mag[1]=3, mag[2]=5, and mag[3]=7. The total number "mag_num" of the magnification rates thus prestored in the ROM 3 is therefore set to four.

Next, in S104 through S115, a standard size ("image size x" and "image size y") and magnification rates ("out mag [i]") to be used for producing the original size from the standard size are determined based on the data size of the original image. In this example, a standard size of (1, 1) and magnification rates (2, 2, 2, and 3) (out_mag[i] (i=0 through 3) are determined. This is because when the standard size 1×1 is enlarged by all the magnification rates 2, 2, 2, and 3 in each of the x and y directions, the original image size of 24×24 will be obtained.

It is noted that in S104–S115, the CPU 1 determines the series of magnification rates so that the total number of small magnification rates included in the determined series is as great as possible as described below.

When desiring to obtain an 8×8 mini sub-image from a standard image with a size of 2×2, for example, the 8×8 mini sub-image can be obtained when the standard image is enlarged by a magnification rate of 2 in each of the x and y directions and again enlarged by the magnification rate of 2 in each direction. However, the image can be directly produced through enlarging the standard image by a magnification rate of 4 in each of the X and Y directions. It is noted, however, that a 4×4 mini sub-image cannot be produced in the latter case. Therefore, in order to allow a great variety of mini sub-images to be produced based on the standard image, smaller magnification rates are preferably set in S104–S115.

This process of S104–S115 will now be described below in more detail.

In S104 to S107, an initial setting is performed. In S104, a variable "image_size_x" is set equal to the original data size "orig_size_x" (24 in this example) in the X direction. Similarly, another variable "image_size_" is set equal to the original data size "orig_size_y" (24 in this example) in the Y direction. In S105, a variable i is set to zero (0). In S106, another variable "total_mag" is set to one (1). In S107, still another variable "out_mag num" is set to zero (0). In S108, at the first routine, i=0. Because the variable "mag_num" is equal to 4 (No in S108), the program proceeds to S109. It is noted that "MOD (A,B)" is to calculate a remainder obtained when A is divided by B. In the case of S109, the "image_size_x" of 24 is divided by a value "mag [i]" where i=0 in the first routine. Because mag [0] is equal to 2, 24÷2=12, and a remainder is calculated as equal to 0. Because "image_size y" is 24, the calculation in S110 is also attained as 24÷2=12, and a remainder is calculated as equal to 0. Accordingly, the program proceeds to S111. In S111, the image size in the X direction is calculated through dividing the present image size of 24 by the present magnification rate of 2 (=mag[0]). In this initial stage, "image_size_x" is therefore calculated as 12 (=24÷ 2). The same calculation is attained for the Y direction in S112. Accordingly, "image_size_y" is calculated also as 12 (=24÷2). A first magnification rate "out_mag[0]" is then set as the present magnification rate of 2 (=mag_[0]) in S113, and the number of already-set magnification rates "out_ mag_num" is incremented by one. As a result, the first magnification rate "out_mag[0]" is set to 2, and "out_ mag_num" is set to 1. The total magnification rate "total_ mag" is calculated in S114. In this first routine, the total magnification rate is calculated as 2=1 (="total mag")×2 (=mag[0]). Then, S109 and subsequent steps are executed in a similar fashion.

For example, during the second routine, in S109, calculation is attained as 12÷2=6, and a remainder of zero (0) is obtained. The same calculation is attained in S110. Then, in S111, image size x is calculated as 6=12÷2. The same calculation is attained in S112.

Then, a second magnification rate "out_mag_[1]" is also set to 2 in S113. During the third routine, each of the present values "image_size_x" and "image_size_y" of 6 is divided by 2 into 3, and zero "0" is obtained as a remainder in S109 and S110. As a result, "image_size_x" and "image size_y" are set to three (3), and a third magnification rate "out_mag_[2]" is set to 2 in S113.

Further, during a fourth routine, in S109 and S110, the present image size ("image_size_x") of 3 is divided by 2, and a remainder of 1 is obtained in S109. The program therefore proceeds to S115 where i is incremented by 1 into 1. Then in S109, the present image size of 3 is divided by 3 (="mag[1]"), and a remainder of 0 is obtained. In S110, the same calculation is attained. In S111 and S112, the values "image_size_x" and "image_size_y" are calculated as one (1). The forth magnification rate "out_may(3)" is therefore set to 3 in S113. The total number of magnification rates "out_mag_num" is set to four. The total magnification rates "total_mag" is calculated as 24 (=1×2×2×2×3) in S114.

Next, because the present image size "1" is divided by the present magnification rate 3 (=mag [1]) into 0 with a remainder 1, the program proceeds to S115. Then, the steps of S108, S109, and S115 are repeatedly performed as (i) is repeatedly incremented by one until (i) becomes four, i.e., equal to the total number "mag_num" of the predetermined magnification rates 2, 3, 5, and 7.

Thus, as the steps S109–S114 are repeatedly performed, the image size 24 of the original image is successively divided by magnification rates of 2, 2, 2, and 3 into 1 because 24÷2÷2÷2÷3=1. Because the final dividing processes in S111 and S112 result in 1, the standard size is determined as (1×1).

Figure 14:
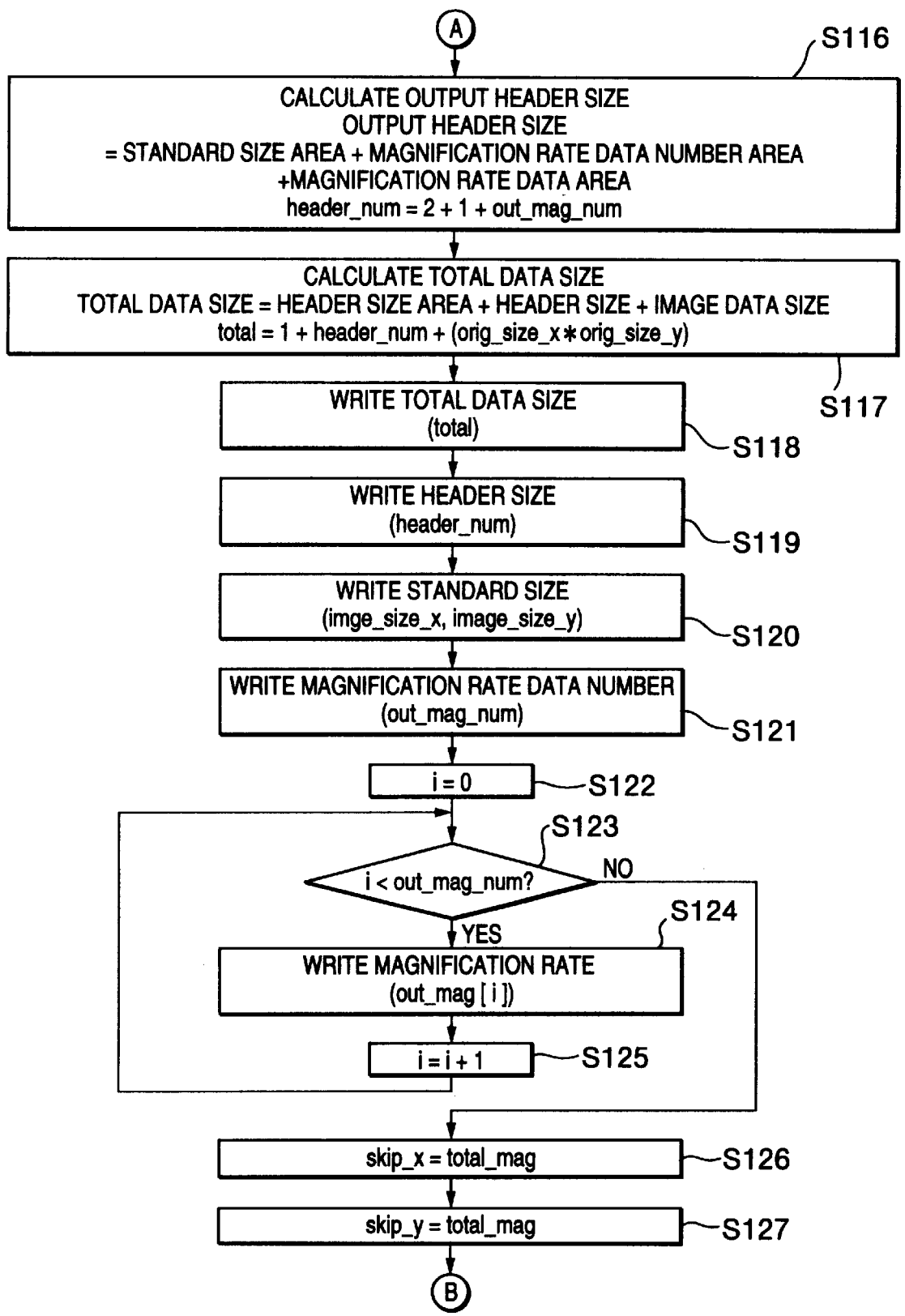
FIG. 14 is another part of the flow chart of the encoding process of FIG. 13.
Figure 15:
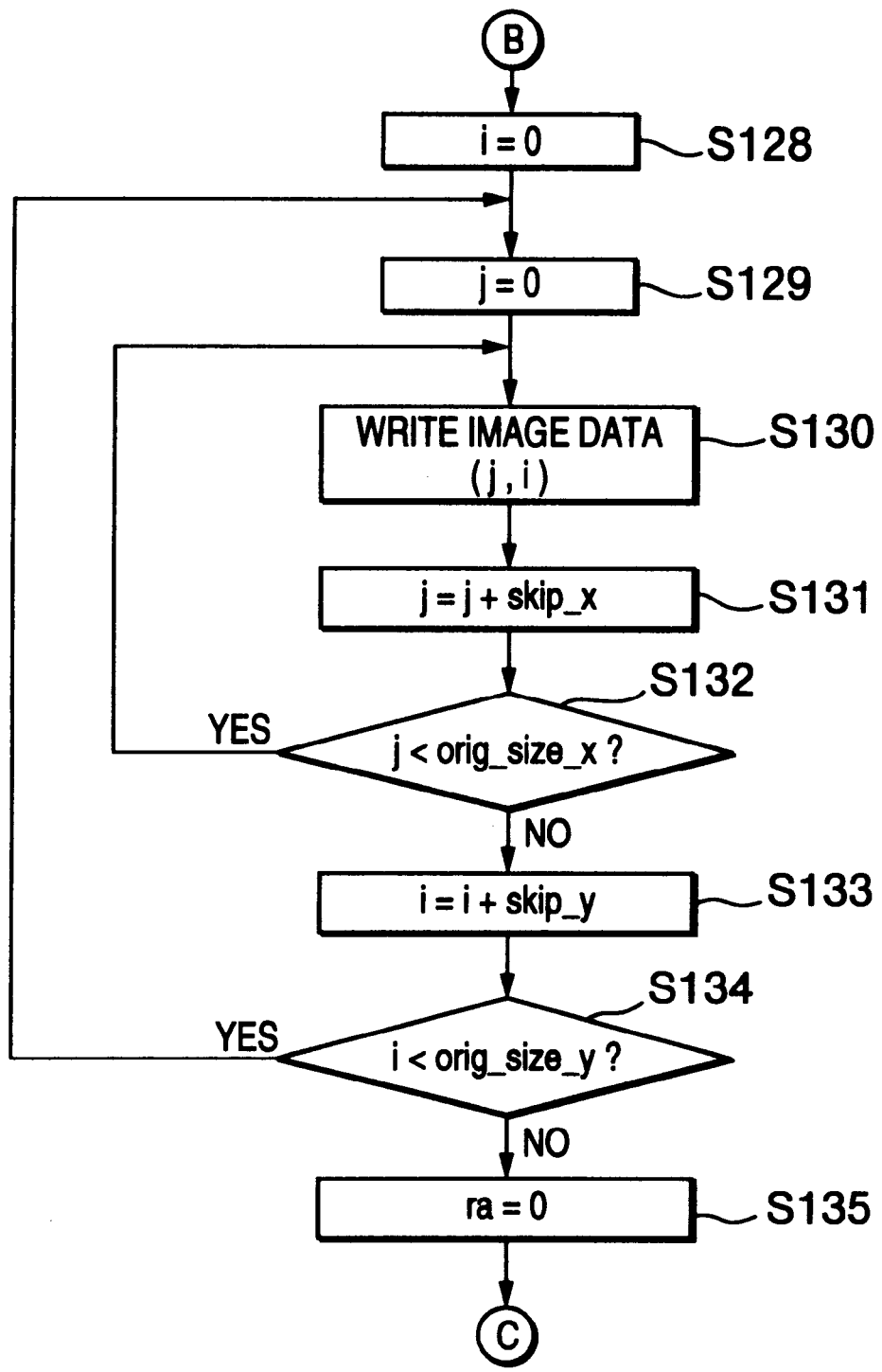
FIG. 15 is still another part of the flow chart of the encoding process of FIG. 13.
Figure 16:
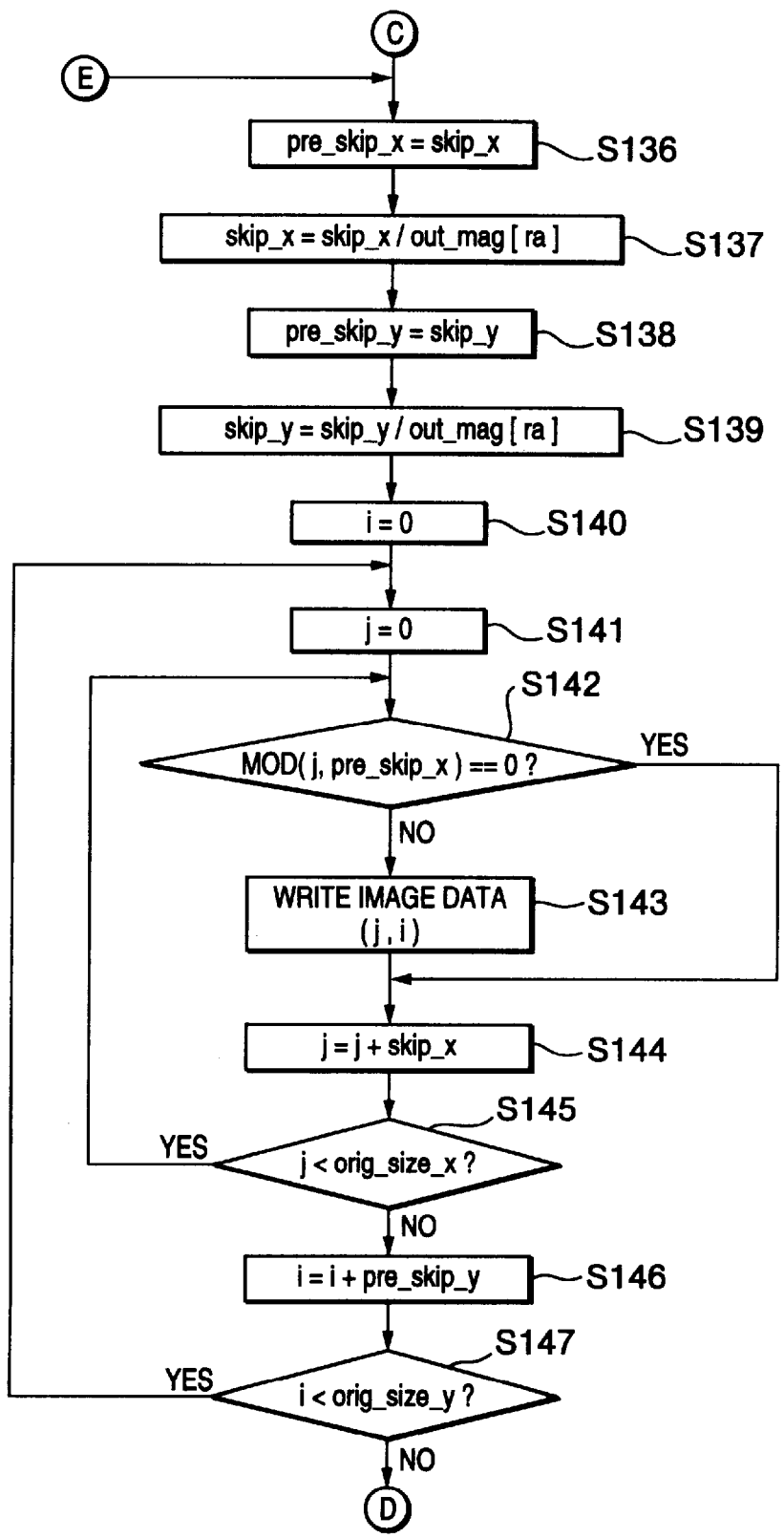
FIG. 16 is still another part of the flow chart of the encoding process of FIG. 13.
Figure 17:
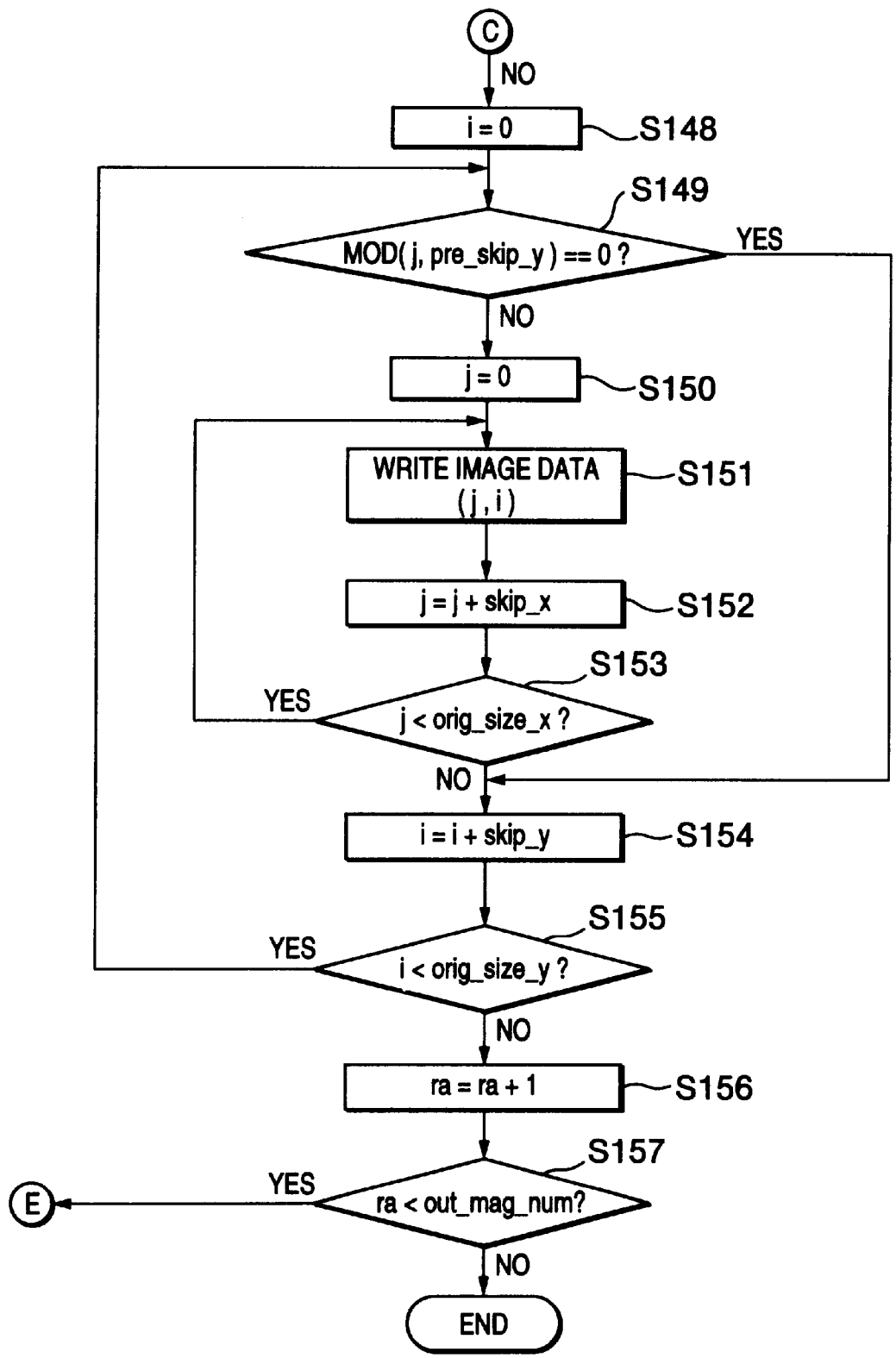
FIG. 17 is still another part of the flow chart of the encoding process of FIG. 13.

When i becomes 4 in S115, the program goes to S116 via S108. As shown in FIG. 14, in S116, an output header size "header_num" is calculated. The size of a standard size area is 2 because 2 bytes are required for indicating the image size of the standard image both in the x and y directions as shown in FIG. 18. The size of a magnification rate number area is calculated as 1, and the size of a magnification rate area is calculated as 4 in this example because four magnification rates 2, 2, 2, and 3 are set in S104–S115. Accordingly, the output header size "header num" is calculated as 7.

In S117, a total data size "total" is calculated. The size of the header size area is 1, taking 1 byte to hold the total data size. The image data size is 576 (=24×24) in this example. The sum of the header size area size of 1, the header size "header_num" of 7, and the pixel data number of 576 is calculated as the total data size "total" of 584.

In S118 through S125, the data obtained in S116 and S117 are stored in the header component of the image format of FIG. 18.

That is, as shown in FIG. 18, in S118, the total data size "584" is stored. Then, in S119, the header size "7" is stored. In S120, the standard size in the x direction and the standard size in the y direction are stored. In this case, the present value "image_size_x" of 1 and the present value "image_size_y" of 1 are stored. Then, in S121, the total number of the determined magnification rates "out_mag num" of 4 is stored. In S122 through S125, the first through fourth magnification rates "out_mag[0]" of 2, "out mag[1]" of 2, "out_mag[2]" of 2, and "out_mag[3]" of 3 are stored. In more concrete terms, the four magnification rates "out_mag [i]" are successively written in the loop of S123–S125 as i is incremented from 0 to 3. When i reaches 4, the left and right sides of the inequality in S123 become both 4, and the program proceeds to S126.

Then, in S126 through S134, the standard data, indicative of the standard image (minimum mini sub-image), is stored. In S135 through S157, all of the received pixel data 1–576 are stored on the basis of the magnification rate data.

First, the processes of S126 through S134 will be described in a greater detail. The total magnification rate "total_mag" (24, in this example) is set to each of variables "skip_x" and "skip_y" defined in the X and Y directions in S126 and S127. The coordinate (j, i) of the pixel data (i.e., the address of each pixel in the original image data shown in FIG. 11) is initialized to (0, 0) in S128 and S129. Then, the pixel data 1 at the present address (0, 0) is written as a first pixel data in S130 as shown in FIG. 18. Because the variable "skip_x" is now equal to 24, j is set to 24 in S131. In S132, both sides in the inequality therefore become 24 (no in S132), and therefore the program proceeds to S133. Because the variable "skip_y" is also now equal to 24, then the program will proceed from S134 to S135. In this example, because the standard size is 1×1, S128 through S134 are conducted only once to store data of the single pixel data 1. However, if the standard size has been determined as 2×2, for example, then the process of S128 to S134 will be repeated four times, thereby storing data of four pixels.

In S135 through S157, the serially-arranged pixel data, shown in FIG. 11, are picked up in a predetermined non-sequential order on the basis of the magnification rate data. Then, the picked-up data are arranged serially, i.e., in the picked up order. In S135, an index "ra," indicative of each of the four magnification rates 2, 2, 2, and 3, is initialized to zero (0). That is, the variable "ra" will vary from 0 to 3. The variable "out_mag[ra]" indicates 2, 2, 2, and 3 when ra=0, 1, 2, and 3, respectively. Then, in S136, a variable "pre_skip_x" is set to the present variable "skip_x" of 24. In S137, the variable "skip_x" is set to 12 (=24/2) because out_mag[0]=2. Then, in S138, a variable "pre_skip_y" is set to the present variable "skip_y" of 24. Then, in S139, the variable "skip_y" is set to 12 (=24/2) because out_mag [0]=2.

S140 and S141 are address initialization steps. In the first routine, a calculation is attained in S142 as 0÷24=0, and a remainder of 0 is obtained in S142. That is, MOD(0,24) is zero (yes in S142). Accordingly, the program proceeds to S144 where j is set to 12 (=0+12). Because 12<24 (size of the original image), the program returns to S142 via S145. During the second routine in S142, a calculation of 12÷24 is attained and a remainder of 12 is obtained. That is, MOD(12, 24) is 12 and is not zero (no in S142). Accordingly, pixel data 13 is retrieved from the address (12,0) of the image data of FIG. 11 and is written in S143 as a second pixel. In S144, j is next set to 24 (=12+12). Because both sides of the inequality in S145 therefore become 24, the process goes to S146. In S146, i (the address in the y direction) is incremented by 24. Because both sides of the inequality in S147 become 24, the program proceeds to S148.

In the first routine, in S149, because 0÷24=0 with a remainder of 0 is calculated, the program proceeds to S154 where i is set to 12 (=present value "skip_y"). Then, the program proceeds via S155 to S151 because the present value i of zero is lower than 24. Then in S151, pixel data 289 is retrieved from an address of (0, 12) of the image data of FIG. 11 and is written as a third pixel.

Then, the program proceeds to S152 where j is set to 12, and the program returns to S151. As a result, pixel data 301 is retrieved from an address (12, 12) of the image of FIG. 11, and is written as a fourth pixel. Next, the program proceeds to S156 via S153–S155.

Then, in S156, the index "ra" is incremented by one into "1". Because 1 is smaller than the total number "4" of the set magnification rates (2, 2, 2, 3) (yes in S157), the program returns to S136. In the second routine of S136–S147, the variables "pre_skip_x" and "pre_skip_y" are both set to 12 in S136 and S138. In S137 and S139, each of the "skip_x" and "skip_y" is set to 6 (=12/2 (=out_mag[1])). In the repeated routine of S142–S147, pixel data 7, 19, 295, and 307, which are at the addresses (6, 0), (18, 0), (6, 12), and (18, 12) in the original of FIG. 11, are written as 5-th through eighth pixels as shown in FIG. 18.

Then, the program proceeds to S148. During the routine of S149–S156, eight pixel data 145, 151, 157, 163, 433, 439, 445, and 451, which are at the addresses (0, 6), (6, 6), (12, 6), (18, 6), (0, 18), (6, 18), (12, 18), and (18, 18) in the original image of FIG. 11, are written as ninth through 16-th pixels as shown in FIG. 18.

During the next routine where the index "ra" becomes equal to 2, the processing is performed with the magnification rate "out_mag[2]" of 2. In the routine of S141–S147, 16 pixel data 4, 10, 16, . . . , 448, and 454, which are at the addresses of (3, 0), (9, 0), (15, 0), (21, 0), (3, 6), (9, 6), (15, 6), (21, 6), (3, 12), (9, 12), (15, 12), (21, 12), (3, 18), (9, 18), (15, 18), (21, 18) in the image of FIG. 11, are written as 17th–32nd pixels as shown in FIG. 18.

Then, in the routine of S149–S155, 24 pixel data 73, 76, . . . , 523, and 526, at addresses of (0, 3), (3, 3), (6, 3), . . . (18, 3), (21, 3), (0, 9), (3, 9) . . . (21, 9), (0, 15), (3, 15), . . . , (21, 15), (0, 21), (3, 21) . . . , (18, 21) and (21, 21) in the image of FIG. 11 are written as 33rd–56th pixels. During the next routine, the remaining 520 pixels 2, 3, . . . , 575, and 576, which are at addresses of (1, 0), (2, 0), . . . , and (23, 24), and (24, 24), are written as 57th–576th pixels.

Thus, when the index "ra" reaches 4 in S156, because both sides in the inequality of S157 become 4 (no in S157), all of the 576 pixels in the image data of FIG. 11 (24×24) are rearranged and stored in the storage format as shown in FIG. 18.

The thus produced image format of FIG. 18 indicates that the standard data size is 1×1 as stored in S120, and the magnification rate data includes 2, 2, 2, and 3 as stored in S124. Accordingly, mini sub-images with sizes of 1×1, 2×2, 4×4, and 8×8, and the original image with the size of 24×24 can be produced from the standard image with the size of 1×1. This is because 2, 4, 8, and 24 are products of the standard size and the magnification rate data (2, 2, 2, and 3). For example, when desiring to obtain a mini sub-image with the size of 8×8, the standard image may be enlarged by the magnification rates of 2, 2, and 2 in each of the x and y directions. It is noted that when desiring to obtain a mini sub-image other than the above-listed images, the mini sub-image can be obtained by first creating one of the above-listed mini sub-images that has a size larger than the desired size, and then reducing the image by thinning it out. Thus, any mini sub-images with a user's desired size can be created from the thus rearranged-and-formatted data.

In more concrete terms, when a user desires to obtain a mini sub-image with a size of N×N where N is either one of 1, 2, 4, 8, and 24, the mini sub-image can be directly produced through enlarging the 1×1 standard image with using the set magnification rates out_mag[i] of 2, 2, 2, and 3. For example, when desiring to produce a 4×4 mini sub-image, the 1×1 standard image may be enlarged in each direction by the magnification rates of 2 and 2. When desiring to produce a 8×8 mini sub-image, the standard image may be enlarged in each direction by the magnification rates of 2, 2, and 2. Contrarily, when the user desires to obtain a mini sub-image with a size of P×P where P is not equal to 1, 2, 4, 8, or 24, the mini sub-image may not be directly produced. In this case, another mini sub-image with a size of N×N, where N is either one of 2, 4, 8, and 24 and N is greater than but closest to P, is provisionally produced by enlarging the standard image with at least one of the magnification rates of 2, 2, 2, and 3. Then, the mini sub-image with the size of P×P is obtained through thinning the produced image. For example, when the user desires to obtain a mini sub-image with a size of 6×6, a mini sub-image with a size of 8×8 is first produced through enlarging the standard image by the magnification rates of 2, 2 and 2 in each direction. Then, the 8×8 image is thinned into the 6×6 image. Similarly, when the user desires to obtain a mini sub-image with a size of 9×9, the original image with the size of 24×24 is first produced through enlarging the standard image by all the magnification rates of 2, 2, 2, and 3 in each direction. Then, the 24×24 image is thinned into the 9×9 image.

Figure 19:
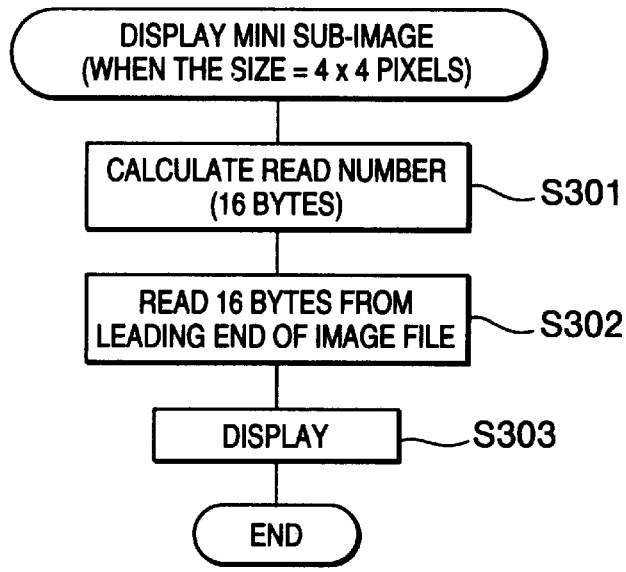
FIG. 19 is a flow chart of a display process for displaying a mini sub-image with a size of 4×4.

FIG. 19 illustrates an example of a display processing process for producing a mini sub-image with a size of N×N where N is either one of 1, 2, 4, 8, and 24. In this example, the size of the mini sub-image desired to be obtained is 4×4. One pixel corresponds to 1 byte. In S301, the size of a mini sub-image to be produced through enlargement of the standard image is determined. In this case, the desired size N×N can be directly produced through the enlargement of the standard image. Accordingly, the size ("mini_x"×"mini_y") of a mini sub-image to be produced through enlargement of the standard image is determined as equal to the desired size, i.e., 4×4. Then, the number of pixels required to be read out from the data format of FIG. 18 is calculated. In this case, the number "16 bytes" is calculated. Then, in S302, 16 bytes of pixel data are read out from the leading end of the image storage area of the image file. In other words, first through 16-th pixel data are retrieved and arranged in corresponding pixel locations as shown in FIG. 25(d). Then, in S303, the arranged pixel data is displayed on the display device 5, or is outputted to the printer 10.

Figure 20:
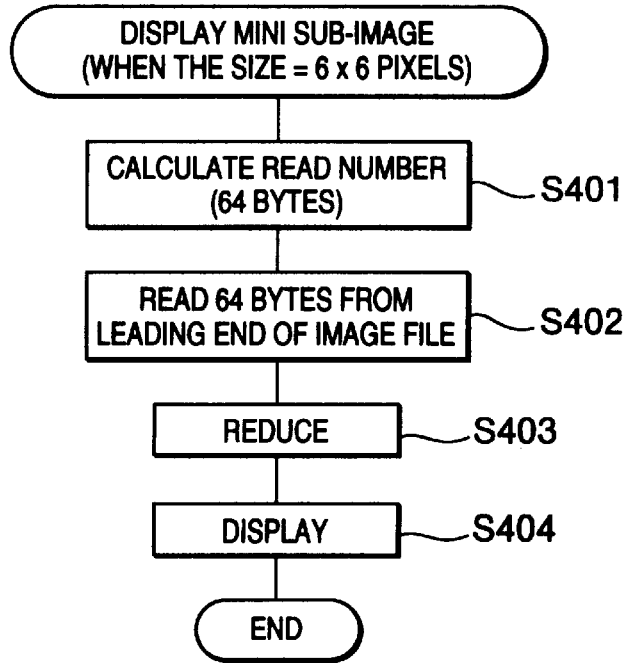
FIG. 20 is a flow chart of a display process for displaying a mini sub-image with a size of 6×6.
Figure 21:
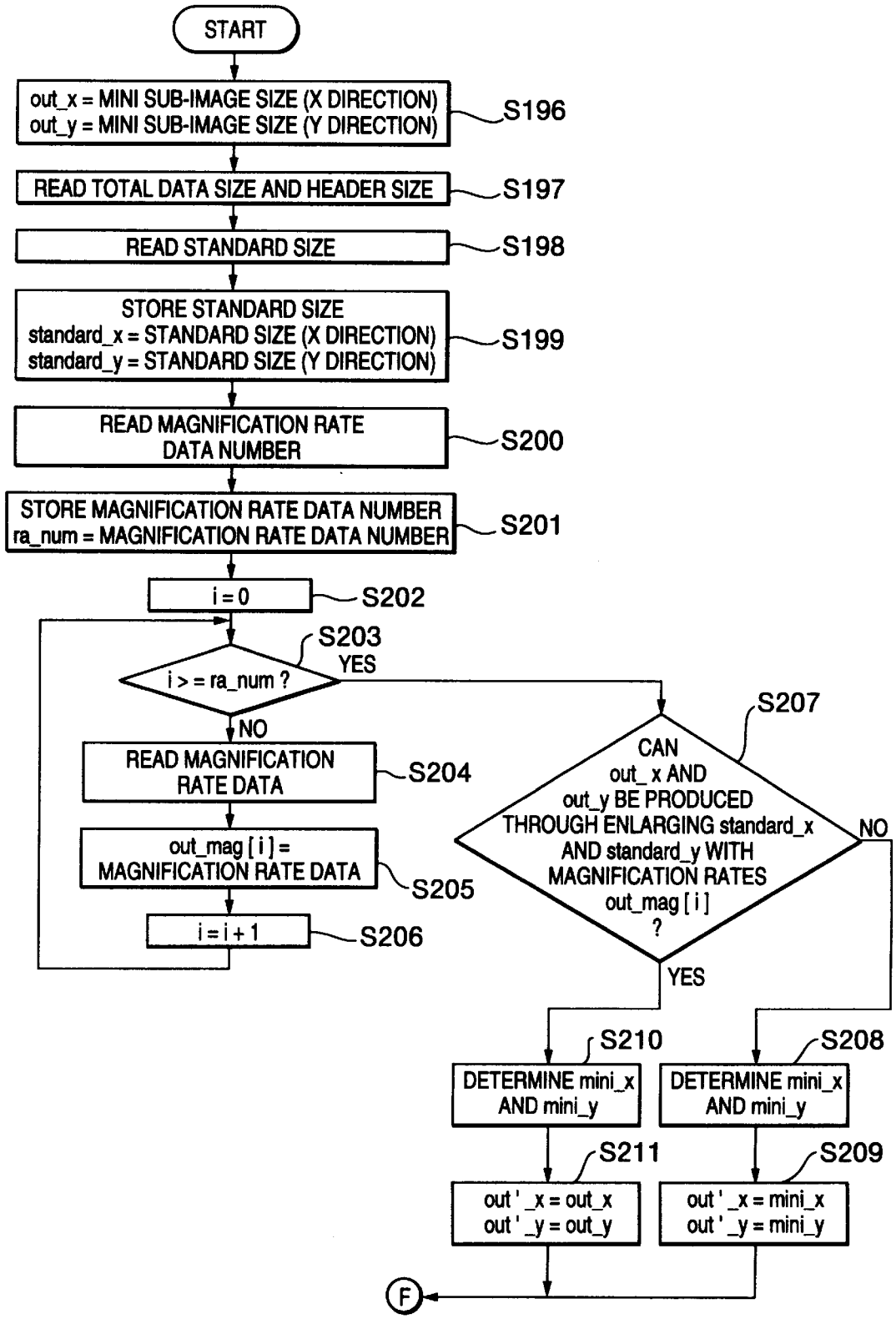
FIG. 21 is a part of a flow chart of a decoding process for creating a desired mini sub-image through retrieving corresponding number of pixel data from the pixel data of FIG. 18 and then arranging the pixel data for display.
Figure 22:
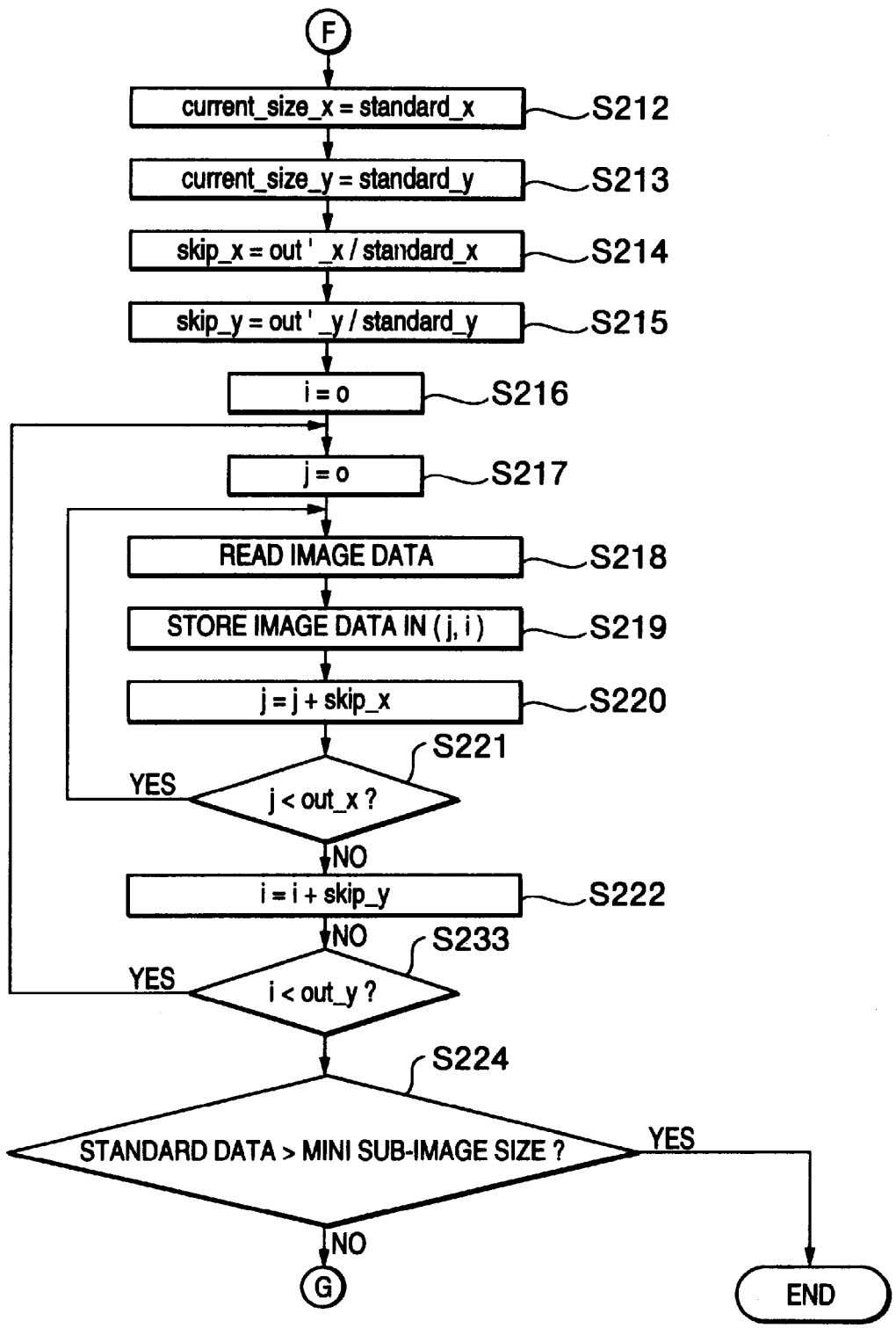
FIG. 22 is another part of the flow chart of the decoding process.
Figure 23:
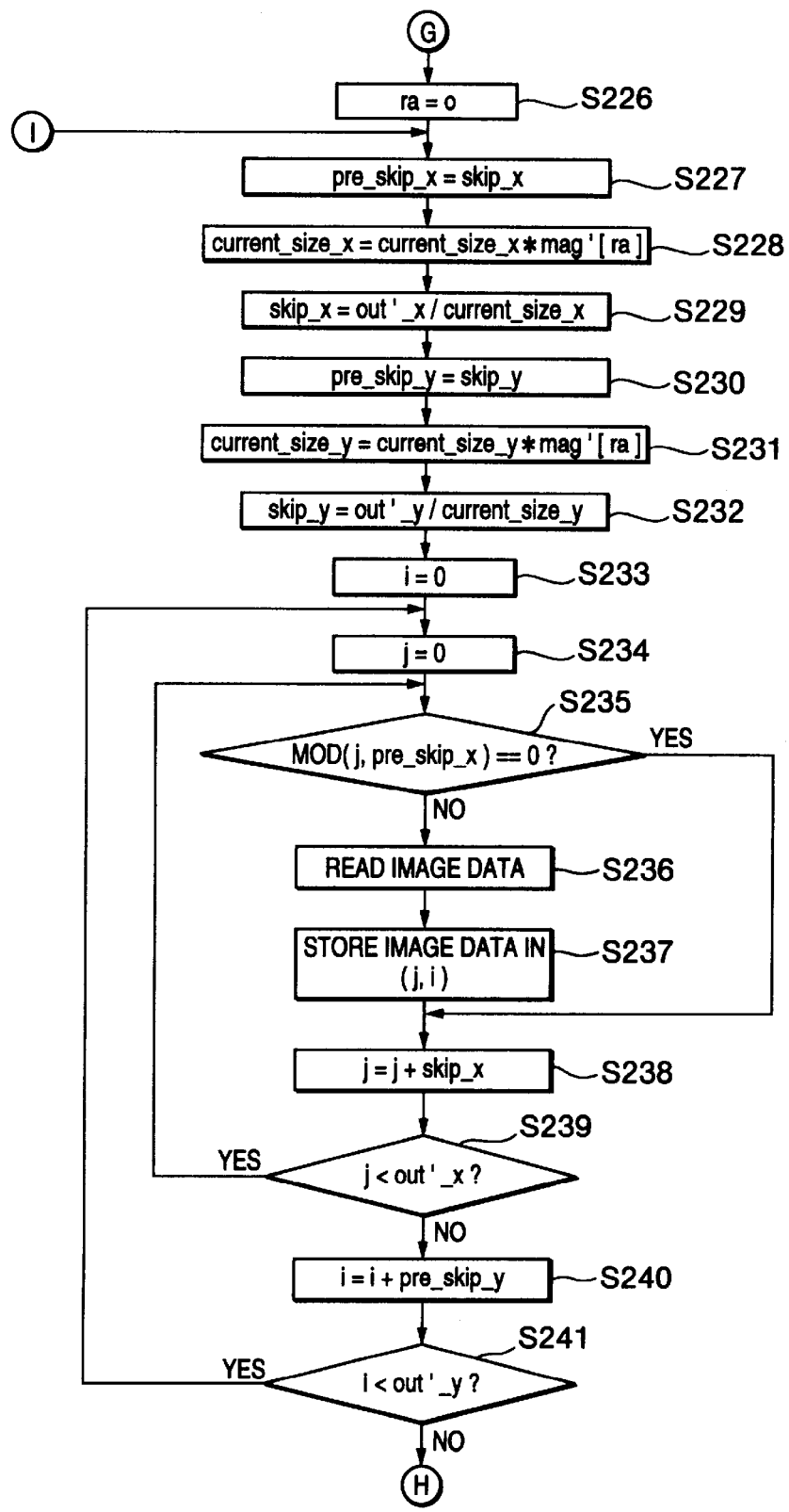
FIG. 23 is still another part of the flow chart of the decoding process.
Figure 24:
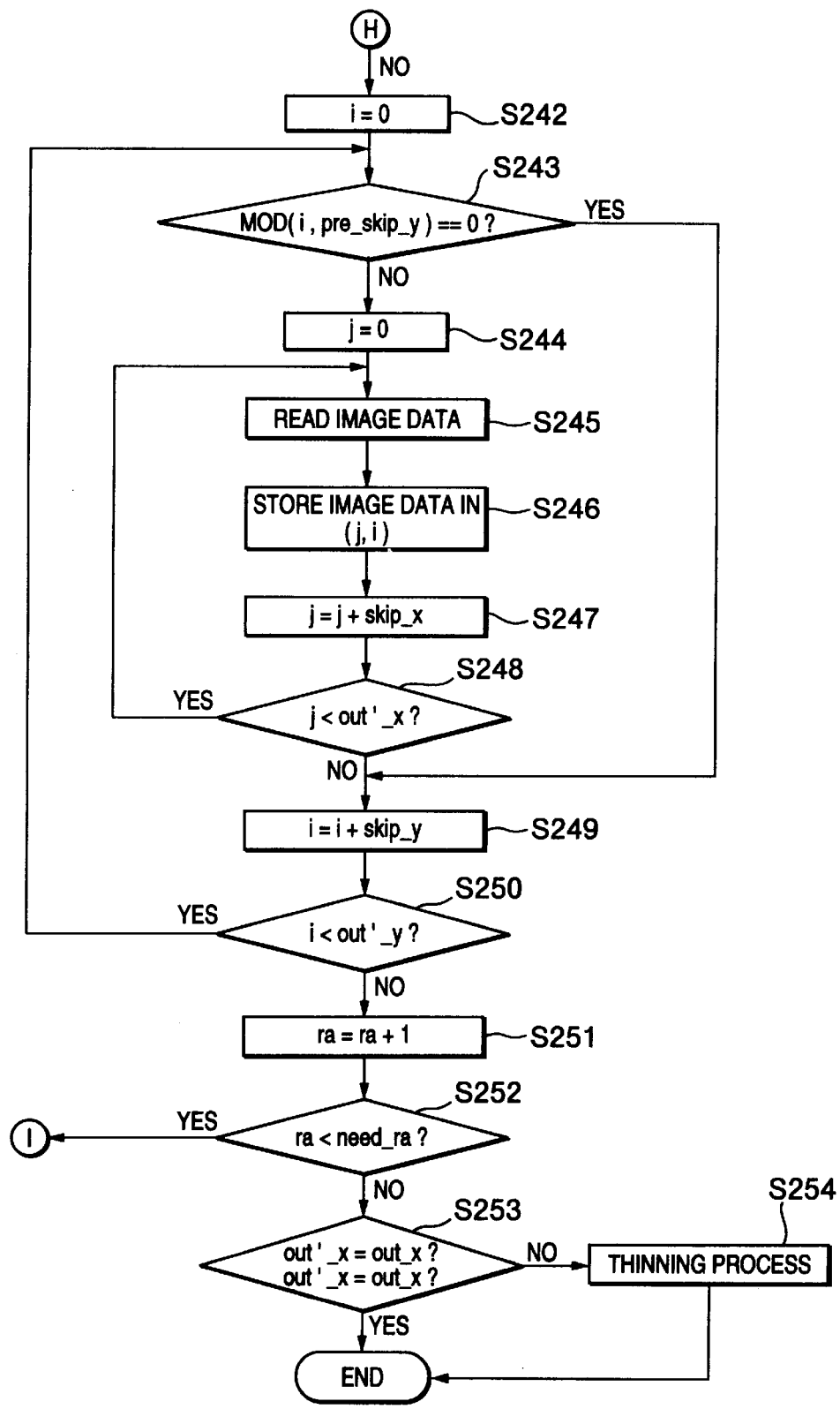
FIG. 24 is still another part of the flow chart of the decoding process.

FIG. 20 illustrates an example of a display processing process for producing another mini sub-image with a size of P×P where P is not equal to 1, 2, 4, 8, or 24. In this example, the size of the mini sub-image desired to be obtained is 6×6. In the same manner as the process of FIG. 19, first in step S401, the size of a mini sub-image to be produced through enlargement of the standard image is determined. Because the desired size is not equal to 1×1, 2×2, 4×4, 8×8, or 24×24, the size ("mini_x"×"mini y") of the mini sub-image to be produced through enlargement of the standard image is set equal to one of 2×2, 4×4, 8×8, and 24×24 that is greater than but closest to the user's desired size. In this example, the CPU 1 determines to produce a 8×8 mini sub-image (provisional image) from the standard image. Then, the number of pixels, 64, required to be read out from the data format is calculated. Then, in S402, 64 bytes of pixel data are read out from the leading end of the image storage area of the image file. In other words, first through 64-th pixel data are retrieved and arranged in corresponding pixel locations. Thus read-out 64-pixels are then subjected to a well-known thinning process (reduction process) in S403. Since the reducing process is well-known in the art, detailed description thereof will be omitted. Then, a mini sub-image, that has been reduced to 6×6 pixels, is displayed in S404. The above-described processes of FIGS. 19 and 20 are considerably more convenient than in the conventional process, in which the mini sub-image is produced through reading all of the image data and then thinning the image data regardless of the size of the desired mini sub-image.

FIG. 25(a) shows a mini sub-image obtained when a user designates the size of his/her desired mini sub-image as 1×1. FIG. 25(b) shows another mini sub-image obtained when the user designates the size of his/her desired mini sub-image as 2×2. FIG. 25(c) shows another mini sub-image obtained when the user designates the size of his/her desired mini sub-image as 3×3. FIG. 25(d) shows another mini sub-image obtained when the user designates the size of his/her desired mini sub-image as 4×4. FIG. 25(e) shows another mini sub-image obtained when the user designates the size of his/her desired mini sub-image as 8×8. FIG. 25(f) shows still another mini sub-image obtained when the user designates the size of his/her desired mini sub-image as 9×9.

It is noted that in order to produce the 3×3 and 9×9 images, a 4×4 mini sub-image (FIG. 25(d)) and a 24×24 image (FIG. 11) are first produced as provisional images in S402. Then, the reduction process of S403 is performed to obtain the 3×3 and 9×9 images according to the thinning process. In this example, in order to produce the 3×3 image from the 4×4 image, the fourth line (pixels 433, 439, 445, and 451) and the fourth column (pixels 19, 163, and 307) are omitted through the thinning process of S403. During the thinning process of S403, the required number of pixels may be omitted through other various manners.

As described above, according to the display process of FIG. 19, when a user designates the size of his/her desired mini sub-image, the CPU 1 determines in S301 a mini sub-image to be obtained through enlarging the standard image. In this case, the size ("mini_x"ב"mini_y") of the determined mini sub-image is the same as that of the user's desired one. The CPU 1 then retrieves pixel data required to produce the determined mini sub-image. Similarly, according to the display process of FIG. 20, when the user designates the size of his/her desired mini sub-image, the CPU 1 determines in S401 a mini sub-image to be obtained through enlarging the standard image. In this case, the size ("mini_x"ב"mini_y") of the determined mini sub-image is greater than that of the user's desired one. Then, the CPU 1 retrieves pixel data required to produce the determined mini sub-image. Thus, the processings in S401–S403 are similar to those in S301–S302 except for the thinning process of S403.

Processes in S301 and S302 and processes in S401 through S403 can be performed in a single series of processes shown in FIGS. 21–24. After the processings of FIGS. 21–24 are completed, the produced image is displayed in the same manner as in S303 and S404. The processings in FIGS. 21–24 involve decoding of the pixel data that have been rearranged and encoded as shown in FIG. 18. This decoding process is performed in a manner reversed from the encoding process of FIGS. 13 through 17.

The steps in the flow charts of FIGS. 21 through 24 will be described below in greater detail.

First, in S196, the size of the user's desired mini sub-image in each of the x and y directions is inputted. That is, values "out_x" and "out_y" are set to the user's designated values. In this example, the user designates a size of 8×8. Accordingly, the values "out_x" and "out_y" are set to 8 and 8, respectively.

In S197, the total data size (584 in this example) and the header size (7 in this example) are read out from the data format of FIG. 18. In S198, the standard size (1×1 in this example) is further read out from the data format. In S199, the retrieved standard size values "1" and "1" are respectively substituted for variables "standard_x" and "standard_y".

In S200 and S201, the total number "4" of the set magnification rates out_mag[i] (2, 2, 2, and 3) is read out, and the number "4" is substituted for a variable "ra_num".

Then, in S202 through S223, data for the standard size image is read out in the following manner.

First, in S203–S206, all the set magnification rates out_mag[i] (i=0 through 3) of 2, 2, 2, and 3 are retrieved from the data format of FIG. 18. It is therefore determined that five images with sizes 1×1, 2×2, 4×4, 8×8, and 24×24 can be obtained through enlarging the 1×1 standard image. When the user's designated size ("out_x"ב"out_y") is equal to either one of the sizes 1×1, 2×2, 4×4, 8×8, and 24×24 (yes in S207), it is determined that the user's designated size can be produced simply through an enlarging process. On the other hand, when the user's designated size ("out_x"ב"out_y") is not equal to any of the sizes 1×1, 2×2, 4×4, 8×8, and 24×24 (no in S207), it is determined that the user's designated size cannot be produced only through the enlarging process. The user's designated size can be produced through not only the enlarging process but also through a thinning process.

When the user's designated size ("out_x"ב"out_y") is equal to either one of the sizes 1×1, 2×2, 4×4, 8×8, and 24×24 (yes in S207), the program proceeds to S210. In S210, at least one magnification rate is determined for obtaining the user's designated mini sub-image. The at least one magnification rate is determined for producing a mini sub-image ("mini_x"ב"mini_y") which is equal to the user's designated mini sub-image ("out_x"ב"out_y"). Because the size of the designated mini sub-image is 8×8 in this example, it is determined that a mini sub-image ("mini_x"ב"mini_y") of 8×8 will be produced through enlarging the 1×1 standard image with the first through third magnification rates "out_mag[0] of 2, out_mag[1] of 2, and out_mag[2] of 2. In this case, no thinning process is necessary. The produced image ("mini_x"ב"mini_y") is equal to the user's designated image. Also in S210, the presently-selected three magnification rates 2, 2, and 2 are set as mag'[0], mag'[1], and mag'[2]. The total number "3" of the thus selected magnification rates is set to a variable "need_ra".

Then, in S211, a variable "out'_x" is set equal to the size "mini_x" of the mini sub-image which is to be produced through enlargement of the "standard x" with the determined magnification rates mag'[0]–mag'[2]. Similarly, a variable "out'_y" is set equal to the size "mini_y" of the mini sub-image which is to be produced through enlargement of the "standard_y" with the determined magnification rates mag'[0]–mag'[2]. In this case, "out'_x" is set to 8, and "out'_y", is also set to 8. In other words, "out'_x" is set equal to the user's designated size "out_x", and "out'_y" is set equal to the user's designated size "out_y".

When the user's designated size ("out_x"ב"out_y") is not equal to any of the sizes 1×1, 2×2, 4×4, 8×8, and 24×24 (no in S207), on the other hand, the program proceeds to S208. In S208, at least one magnification rate is determined for producing a mini sub-image ("mini_x"ב"mini_y") which is either one of sizes 1×1, 2×2, 4×4, 8×8, and 24×24 that is larger than and closest to the user's designated mini sub-image ("out_x"ב"out_y"). For example, when the user designates the size of 9×9, it is necessary to first produce the original image with the size of 24×24, which is greater than and closest to 9×9, and then to thin the 24×24 image into the 9×9 image. In this case, a provisional image ("mini_x"ב"mini_y") with the size of 24×24 may be first produced through enlarging the 1×1 standard image with all the magnification rates "out_mag[0] of 2, out_mag[1] of 2, out_mag[2] of 2, and out mag[3] of 3. The produced image ("mini_x"ב"mini_y") is then thinned into the 9×9 user's designated image. Also in S210, the presently-determined four magnification rates 2, 2, 2, and 3 are set as mag'[0], mag'[1], mag'[2] and mag'[3]. The total number "4" of the thus set magnification rates is set to a variable "need_ra". Then, in S209, a variable "out'_x" is set equal to the size "mini_x" of the mini sub-image (provisional image) which is to be produced through enlargement of the "standard x"

with the determined magnification rates mag'[0]–mag'[3]. Similarly, a variable "out'_y" is set equal to the size "mini_y" of the mini sub-image (provisional image) which is to be produced through enlargement of the "standard_y" with the determined magnification rates mag'[0]–mag'[3]. In this case, "out'x" is set to 24, and "out'_y" is also set to 24. Thus, "out'_x" is set different from the user's designated size "out_x" (9), and "out'_y" is set different from the user's designated size "out_y" (9).

When the process of S211 or S209 is completed, the program proceeds to S212.

In the first stage, the values "current_size_x" and "current_size_y" are both set to 1 (standard size) in S212 and S213. In S214 and S215, each of the variables "skip_x" and "skip_y" is calculated through dividing the determined image size "out'_x" and "out'_y" by the standard size of 1. In this example, because the user designates 8×8 in S196 and the values "out'_x" and "out'_y" are set to 8 in S211, variables "skip_x" and "skip_y" are calculated as 8 and 8.

It is noted that in the following description, variables "j" and "i" refer to an address (j, i) in the x and y coordinate where the mini sub-image with the size of "out'_x"×"out'_y" is to be developed.

First, in S218, first pixel data 1 is retrieved from the leading end of the image storage area in the data format of FIG. 18. The pixel data 1 is developed in the address (0, 0) of the 8×8 mini sub-image in S219. Then, j=0+8=8 in S220 and i=0+8=8 in S222. A negative judgment is attained in both S221 and S223, and the program proceeds to S224.

In S224, the process is ended if the standard size ("standard_x"×"standard_y") is greater than the size ("out'_x"×"out'_y") of the image determined to be produced. If the standard size ("standard_x"×"standard_y") is equal to or smaller than the determined image size ("out'_x"×"out'_y"), the program proceeds to S226.

Then, in S226 through S252, the standard image produced in S219 is enlarged with the magnification rates mag'[i] which are set in S208 or S210 into the determined image with the size of "out'_x"×"out'_y".

That is, in S226, the index "ra" of the magnification rate data is first initialized to 0. The magnification rate is therefore set to 2 (=mag'[0]). In S227, the variable "pre_skip_x" is set to the present variable "skip_x" of 8. The same calculation is attained in S230 to set the variable "pre_skip_y" to the present variable "skip_y" of 8. Because the standard data is 1×1 and because the "mag'[ra]"=2 when "ra"=0, the "current_size_x" becomes 2 (=1×2) in S228. In S229 and so on, the size of the determined image ("out'_x") is divided by the current size, and a pixel interval "skip_x" in the x direction is calculated for the production of the mini sub-image. In this case, "skip_x"=8/2=4. S231 and so on involve the same processing in the y direction. Also in this case, "skip_y"=8/2=4. Then, in S235, because j=0 and 0÷"pre_skip_x" (8)=0 and a remainder of 0 is obtained, a loop of S235 through S239 is produced. In the next loop, the second pixel 13 is retrieved from the data format of FIG. 18 in S236, and is stored in S237 at the address (4, 0) as shown in FIG. 25(e).

Then, i is incremented by 8 in S240, and the program proceeds to S242 via S241. Then, in a successively-performed routine of S242–S250, the third and fourth pixel data 289 and 301 are retrieved in S245 and stored in the addresses of (0, 4) and (4, 4) of the mini sub-image as shown in FIG. 25(e).

Then, the program proceeds to S251, where "ra" is incremented by one into "1". Because 1 is smaller than the total number "3" of the determined magnification rates, the program returns via S252 to S227.

In this routine, the variables "pre_skip_x" and "pre_skip_y" are both set to 4 in S227 and S230. The variables "skip_x" and "skip_y" are set to 2 in S229 and S232. In S235–S241, the fifth through eighth pixel data 7, 19, 295, and 307 are retrieved and stored at addresses of (2, 0), (6, 0), (2, 4), and (6, 4) of the mini sub-image.

Then, in S243–S250, the ninth through 16-th pixel data 145–451 are retrieved from the data format of FIG. 18 and stored at addresses of (0, 2), (2, 2), (4, 2), (6, 2), (0, 6), (2, 6), (4, 6), and (6, 6), respectively.

Then, in S252, the index "ra" is set to 2. In the next routine, the variables "pre_skip_x" and "pre_skip_y" are both set to 2, and "skip_x" and "skip_y" are both set to 1. Then, in the loop of S234–S241, the next 16 pixel data 4–454 are retrieved from the data format of FIG. 18 and stored in (1, 0), (3, 0), (5, 0), (7, 0), (1, 2), (3, 2), (5, 2), (7, 2), (1, 4), (3, 4), (5, 4), (7, 4), (1, 6), (3, 6), (5, 6), and (7, 6). Then, in the routine of S242–S250, the next eight pixel data 73–94 are retrieved and stored on the second line (0, 1)–(7, 1), the next eight pixel data 217–238 are retrieved and stored on the forth line (0, 3)–(7, 3), the next eight pixel data 361–382 are retrieved and stored on the sixth line (0, 5)–(7, 5), and the next eight pixel data 505–526 are retrieved and stored on the eighth line (0, 7)–(7, 7). As a result, the 8×8 mini sub-image shown in FIG. 25(e) is obtained.

After all the pixels are thus arranged with using all the magnification rates mag'[ra] (ra=0 through 2), when the variable "ra" is incremented into 3 in S251, the program proceeds via S252 to S253. In S253, it is judged whether or not the size "out'_x"×"out'_y" of the obtained image is equal to the user's designated size "out_x"×"out_y". Because the user's designated 8×8 image is obtained in this example (yes in S253), the program ends.

On the other hand, when the user designates in S196 an image other than the images 1×1, 2×2, 4×4, 8×8, or 24×24, the size "out'_x"×"out'_y" of the presently-obtained image is greater than the user's designated size "out_x"×"out_y". For example, when the user designates the 9×9 image, a 24×24 image is produced. In this case, the program proceeds to S254 (no in S253), and the obtained image is thinned into the user's designated 9×9 image.

As described above, according to the present embodiment, image data is stored not in a sequential pixel order, but rather in an order such that adjacent pixels will be farther apart. As a result of storage in this order, mini sub-images of different sizes are obtained according to the pixels that are sequentially read out from the leading end. There is no need for previously producing and storing these mini sub-images.

Figure 26:
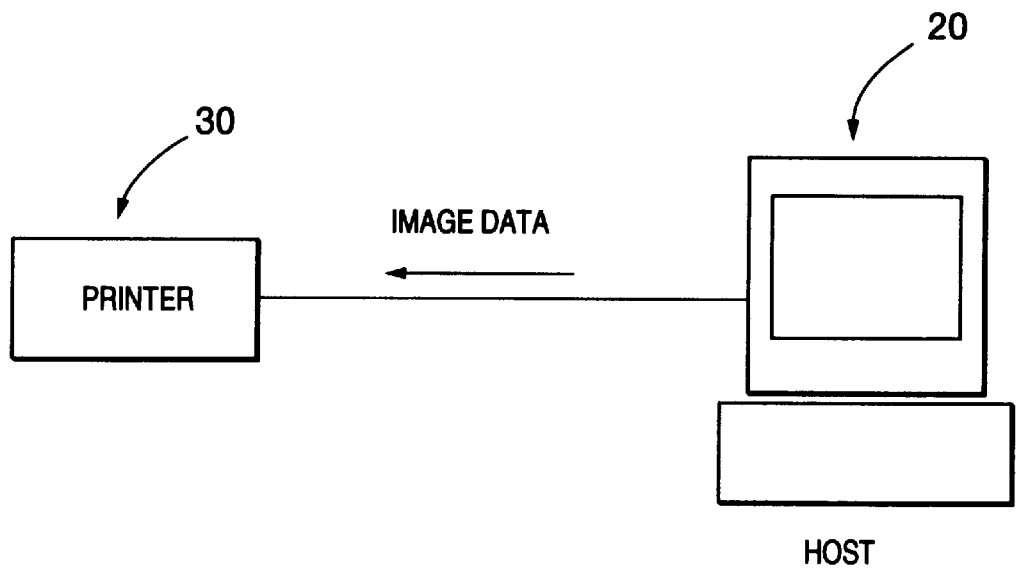
FIG. 26 is an explanatory diagram of a modification of the image storing-and-outputting device of the present invention.

FIG. 26 shows a modification of the present embodiment. A host computer 20 is connected to a printer 30. Image data sent from the host computer 20 is printed out by the printer 30. The image data is stored in the host computer 20 in the pixel order as shown in FIG. 18 for creating the mini sub-image architecture as described above. The pixel data will be sent to the printer 30 in this order from the leading end.

The host computer 20 can, however, store the pixel data in an ordinary sequential fashion as shown in FIG. 11. In this case, the pixels will be read out in the non-sequential order as shown in FIG. 18 and then sent to the printer 30. As a result, on the printer 30 side, after data of the required size has been received, the remaining data can be skipped over, and therefore higher-speed processing is possible.

Also, if the printer capability is only 300 dpi, when image data of 1200 dpi is sent from the host computer 20 to the printer 30, the printer 30 may start printing the received image at 300 dpi when the printer 30 has received the 300 dpi worth of data.

Figure 27:
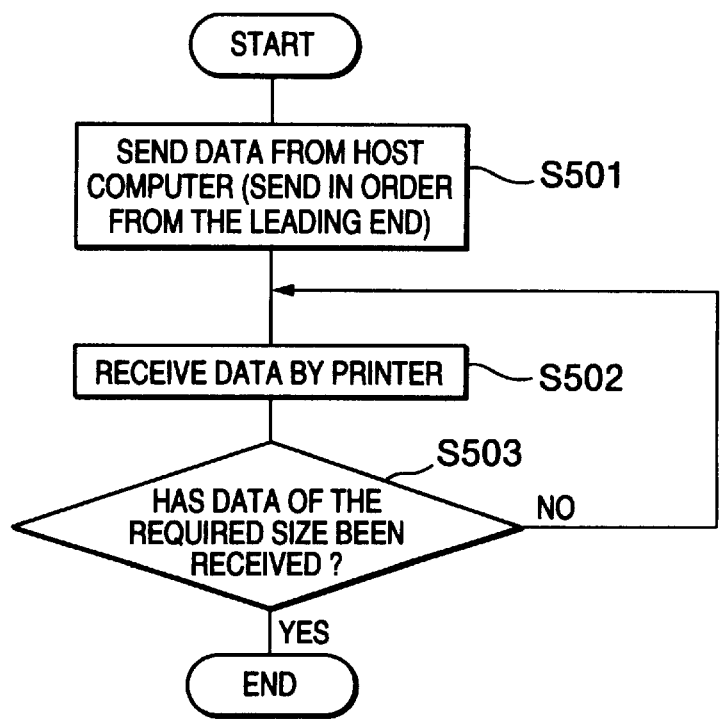
FIG. 27 is a flow chart of a data sending process employed in the modification.

FIG. 27 illustrates the above-described process. Image data is sent from the host computer in S501. For example, the data is sent to the printer 30 in the order in which it is stored in the host computer 20 as shown in FIG. 18. The printer 30 receives this data in S502. In S503, it is judged whether or not data of the required size has been received. When receipt of the required size has been completed, the data receipt by the printer is terminated.

The remaining data may not be skipped over after the required amount of data has been processed. The host computer 20 may be controlled so that data more than required will not be sent to the printer. The following processes are examples of this processing method.

(1) The computer is informed in advance of the resolution of the printer through a command via an interface or the like. The computer analyzes the header component and the like of the data stored therein, and reads out only the required amount data. The computer sends the read out data to the printer.

(2) Alternatively, the computer may start sending the image data to the printer without knowing the resolution of the printer. The printer sends to the computer a status command for instructing that no further data is required when the printer has completely received the required data. Also according to this method, unnecessary data transmission is eliminated.

While the invention has been described in detail with reference to the specific embodiment thereof, it would be apparent to those skilled in the art that various changes and modifications may be made therein without departing from the spirit of the invention, the scope of which is defined by the attached claims.

As described above, according to the present invention, the image storing-and-outputting device receives a plurality of sets of pixel data in a sequential order. The plurality of sets of pixel data are bit map data constituting a data matrix indicative of an entire original image. In the device, at least a part of the received plurality of sets of pixel data are rearranged in a predetermined non-sequential order. The sets of pixel data may be stored in the rearranged order in the memory area of the device. When outputting at least a part of the received plurality of sets of pixel data, the at least a part of the pixel data are sequentially retrieved from the memory area in the rearranged order. The thus sequentially-retrieved pixel data are arranged to reproduce the entire original image with a size corresponding to the retrieved number of pixel data.

According to the present invention, it is unnecessary to previously produce a mini sub-image of a certain size. It is therefore unnecessary to provide any mini sub-image storing area in the header portion of the data memory area. It is possible to easily obtain mini sub-images of any desired sizes through changing the number of pixels to be retrieved from the memory area. It is possible to obtain the user's desired sized mini sub-images within a short period of time.

The image storing-and-outputting device has other various advantages when outputting the pixel data to an image output device such as a printer. When the printer has a low resolution, it is unnecessary to send all the pixel data to the printer. Even when all the pixel data is sent to the printer, the pixel data will not be processed in vain. In this circumstance, only a small number of pixel data will be sequentially retrieved from the leading end of the memory area and then sent to the printer. This data sending operation can be performed when the printer has a high printing ability but is instructed to print out a low resolution image within a shorter period of time.

According to the above-described embodiment, in order to produce any desired mini sub-images from the rearranged pixel data sets, the memory area is formed with the header portion. The header portion stores data indicative of how to retrieve a certain number of sets of pixel data from the memory area when producing a mini sub-image of a desired size. The header portion includes: the standard size memory area storing data of the standard size of the basic pattern for constructing any desired mini sub-images; the magnification rate memory area storing data of magnification rates of 1, 2, or more, with which the standard sized basic pattern can be enlarged in order to produce the desired mini sub-image; and a memory area for developing or rearranging the pixel data sets in the non-sequential order. When desiring to obtain a mini sub-image with a desired size, a corresponding number of pixel data sets will be retrieved from the memory area in the order of storage.

In order to produce a mini sub-image of a desired size, a corresponding number of pixel data sets are serially retrieved from the memory area, and then developed in a non-sequential order in a data matrix for producing the two-dimensional image. The number of pixel data sets to be retrieved is determined based on the standard size data and the magnification rate data. Thus, it is possible to produce the desired mini sub-image through the software processing, even though the mini sub-image is not previously stored in the memory area.

It is noted that the magnification rate is determined dependent on the standard size and the size of the desired mini sub-image. Based on the determined magnification rate, pixel data sets are arranged with an interval corresponding to the magnification rate. Then, subsequent sets of pixel data are developed in the spacing between the already-developed adjacent pixel data sets.

When producing the desired mini sub-image, the pattern of the standard size is first created through successively retrieving a corresponding number of pixel data sets and through arranging the pixel data sets. Then, it is judged whether or not the size of the desired mini sub-image can be produced through simply enlarging the standard size with the stored magnification rates. When the desired mini sub-image size is a product of the standard size and at least one of the stored magnification rates, the mini sub-image can be produced through simply adding subsequent sets of pixel data to the standard size pattern. When the desired mini sub-image is not any product of the standard size and the stored magnification rates, on the other hand, a provisional mini sub-image is first produced. The size of the provisional mini sub-image is a product of the standard size and at least one of the stored magnification rates. The provisional mini sub-image size is larger than the size of the desired mini sub-image. When the provisional mini sub-image is produced, the provisional mini sub-image is thinned to the size of the desired mini sub-image, thereby producing the desired mini sub-image.

In the above description, when receiving the successive sets of pixel data, the device rearranges the pixel data in the non-sequential order. Then, the device stores the plurality of sets of pixel data in the order which is different from the serial order in which the plurality of sets of the pixel data are received. When outputting, the device transmits the sets of pixel data in the presently-stored order. However, the device may not rearrange the pixel data sets before storing the pixel data sets. The device may store the pixel data sets as arranged in the order as received in the device. The device may rearrange the pixel data sets before outputting the pixel data sets to the image output device.

What is claimed is:

1. An image outputting device for outputting image data, the device comprising:

reception means for receiving a plurality of sets of pixel data in a first sequential order, the plurality of sets of pixel data arranged in the first sequential order constituting a data matrix indicative of an entire original image;

rearranging means for rearranging at least a part of the received plurality of sets of pixel data in a predetermined non-sequential order that is determined based on positional information of the at least a part of the received plurality of sets of pixel data, defined relative to a sub-image that corresponds to the original image and that is constructed from the at least a part of the plurality of sets of pixel data so that the at least a part of the received plurality of sets of pixel data are rearranged in a second sequential order different from the first sequential order; and retrieving means for retrieving the rearranged at least a part of the plurality of sets of pixel data in the second sequential order, the retrieved at least a part of the plurality of sets of pixel data constituting the sub-image corresponding to the original image.

2. An image outputting device as claimed in claim 1, further comprising output means for further rearranging the retrieved sets of pixel data in another predetermined non-sequential order that corresponds to the predetermined non-sequential order to reproduce the image corresponding to the original image.

3. An image outputting device as claimed in claim 2, further comprising storage means for storing the rearranged sets of pixel data in the second sequential order as rearranged by the rearranging means, the retrieving means retrieving the rearranged sets of pixel data in the order stored in the storage means.

4. An image outputting device as claimed in claim 3, wherein the rearranging means rearranges all the received plurality of sets of pixel data in the predetermined non-sequential order that is determined based on positional information of all the received plurality of sets of pixel data, defined relative to the original image and relative to at least one image that corresponds to the original image and is constructed from a corresponding number of sets of the pixel data, so that all the received plurality of sets of pixel data are rearranged in the second sequential order different from the first sequential order, wherein the retrieving means retrieves, in the second sequential order, at least one set of pixel data from the rearranged plurality of sets of pixel data, the retrieved at least one set of pixel data constituting the corresponding image.

5. An image outputting device for outputting image data, the device comprising:

reception means for receiving a plurality of sets of pixel data in a sequential order, the plurality of sets of pixel data constituting a data matrix indicative of an entire original image;

rearranging means for rearranging at least partly the received plurality of sets of pixel data in a predetermined non-sequential order;

retrieving means for retrieving at least a part of the rearranged sets of pixel data in a sequential order as rearranged by the rearranging means;

output means for further rearranging the retrieved sets of pixel data in another predetermined non-sequential order to reproduce the original order; and storage means for storing the rearranged sets of pixel data in the sequential order as rearranged by the rearranging means, the retrieving means retrieving the rearranged sets of pixel data in the order stored in the storage means, wherein the retrieving means retrieves a desired number of the rearranged sets of pixel data in the order stored in the storage means, the outputting means further rearranging the desired number of sets of pixel data and outputting the further rearranged sets of pixel data indicative of a desired mini sub-image.

6. An image outputting device as claimed in claim 5, wherein the outputting means includes a header storage area for storing information indicative of the number of sets of pixel data to be retrieved from the storage means in order to produce the mini sub-image of a desired size.

7. An image outputting device as claimed in claim 6, wherein the header storage area includes:

a standard size memory area for storing data of a standard size of a basic pattern for constructing any desired mini sub-images;

a magnification rate memory area for storing data of magnification rates, with which the standard sized basic pattern is to be enlarged in order to produce any desired mini sub-images; and a developing area for developing, in the non-sequential order, the pixel data sets received by the reception means, the retrieving means retrieving, from the developing area, at least a part of the pixel data sets, the number of the retrieved pixel data sets corresponding to the size of the desired mini sub-image.

8. An image outputting device as claimed in claim 7, wherein the number of pixel data sets to be retrieved is determined based on the standard size data and the magnification rate data.

9. An image outputting device as claimed in claim 8, wherein the outputting means further includes mini sub-image production control means for controlling the retrieving means to retrieve a corresponding number of pixel data sets in the order of storage from the storage means and then for developing the retrieved pixel data sets in the other non-sequential order into a data matrix for producing the desired mini sub-image.

10. An image outputting device as claimed in claim 9, wherein the mini sub-image production control means includes:

standard size retrieving means for retrieving data of the standard size from the standard size memory area;

comparison means for comparing the standard size with the size of the desired mini sub-image;

magnification rate determination means for determining, dependent on the comparison result, a magnification rate with which the standard size is to be enlarged;

means for rearranging pixel data sets indicative of the standard size pattern with an interval corresponding to the magnification rate; and developing means for developing subsequent sets of pixel data in the spacing between the already-developed adjacent pixel data sets.

11. An image outputting device as claimed in claim 10, wherein the mini sub-image production control means further includes:

means for judging whether or not the size of the desired mini sub-image with a product of the standard size and at least one of the stored magnification rates;

means for producing the mini sub-image through simply adding subsequent sets of pixel data to the standard size pattern when the desired mini sub-image size is equal to the product of the standard size and at least one of the stored magnification rates;

means for producing a provisional mini sub-image when the desired mini sub-image is not any products of the standard size and the stored magnification rates, the size of the provisional mini sub-image being a product of the standard size and at least one stored magnification rate and being larger than the size of the desired mini sub-image; and means for thinning the provisional mini sub-image to the size of the desired mini sub-image, thereby producing the desired mini sub-image.

* * * * *